United States Patent
Rune

(10) Patent No.: US 11,985,676 B2
(45) Date of Patent: May 14, 2024

(54) USING DUAL-SLOT PDCCH MONITORING PATTERN FOR PAGING OCCASION COINCIDING WITH SYNCHRONIZATION SIGNAL BURST SET

(71) Applicant: Telefonaktiebolaget LM Ericsson (publ), Stockholm (SE)

(72) Inventor: Johan Rune, Lidingö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 519 days.

(21) Appl. No.: 17/266,701

(22) PCT Filed: Aug. 9, 2019

(86) PCT No.: PCT/SE2019/050734
§ 371 (c)(1),
(2) Date: Feb. 8, 2021

(87) PCT Pub. No.: WO2020/032868
PCT Pub. Date: Feb. 13, 2020

(65) Prior Publication Data
US 2021/0185652 A1 Jun. 17, 2021

Related U.S. Application Data

(60) Provisional application No. 62/716,770, filed on Aug. 9, 2018.

(51) Int. Cl.
*H04W 4/00* (2018.01)
*H04W 72/0446* (2023.01)
*H04W 72/23* (2023.01)

(52) U.S. Cl.
CPC ....... *H04W 72/23* (2023.01); *H04W 72/0446* (2013.01)

(58) Field of Classification Search
USPC .......................... 370/329, 330, 328
See application file for complete search history.

(56) References Cited

U.S. PATENT DOCUMENTS

2016/0338046 A1 11/2016 Chen et al.
2019/0222357 A1* 7/2019 Huang .................. H04L 5/0094
(Continued)

FOREIGN PATENT DOCUMENTS

WO 2017078373 A1 5/2017

OTHER PUBLICATIONS

3GPP, "3rd Generation Partnership Project; Technical Specification Group Radio Access Network; NR; Physical layer procedures for control (Release 15)", 3GPP TS 38.213 V15.2.0, Jun. 2018, 1-99.
(Continued)

*Primary Examiner* — Chuong T Ho
(74) *Attorney, Agent, or Firm* — WEISBERG I.P. LAW, P.A.

(57) ABSTRACT

A method by a wireless device (110) is provided for monitoring a physical downlink control channel, PDCCH, for paging messages. While monitoring the PDCCH for paging messages for a group of slots for a duration, the method includes initiating monitoring of one or more first PDCCH monitoring occasions in a first slot according to a first PDCCH monitoring parameter associated with a first monitoring symbol pattern and initiating monitoring of one or more second PDCCH monitoring occasions in a second slot according to a second PDCCH monitoring parameter associated with a second monitoring symbol pattern. The group of slots include at least the first slot and the second slot, and the second slot consecutively follows the first slot. The first monitoring symbol pattern is different from the second monitoring symbol pattern.

23 Claims, 22 Drawing Sheets

(56) References Cited

U.S. PATENT DOCUMENTS

| | | | |
|---|---|---|---|
| 2019/0223204 A1 | 7/2019 | Kim et al. | |
| 2019/0230685 A1* | 7/2019 | Park | H04W 72/12 |
| 2019/0297577 A1* | 9/2019 | Lin | H04W 52/0219 |
| 2019/0373577 A1* | 12/2019 | Agiwal | H04W 24/08 |
| 2020/0022144 A1* | 1/2020 | Papasakellariou | H04W 72/23 |
| 2020/0396686 A1* | 12/2020 | Tiirola | H04W 52/0229 |
| 2023/0336298 A1* | 10/2023 | Wagner | H04L 5/0048 |

OTHER PUBLICATIONS

3GPP, "3rd Generation Partnership Project; Technical Specification Group Radio Access Network; NR; Physical channels and modulation (Release 15)", 3GPP TS 38.211 V15.2.0, Jun. 2018, 1-96.

3GPP, "3rd Generation Partnership Project; Technical Specification Group Radio Access Network; NR; Physical layer procedures for control (Release 15)", 3GPP TS 38.213 V15.1.0, Mar. 2018, 1-77.

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.

3GPP, "3rd Generation Partnership Project; Technical Specification Group Radio Access Network; NR; User Equipment (UE) procedures in Idle mode and RRC Inactive state (Release 15)", 3GPP TS 38.304 V15.0.0, Jun. 2018, 1-25.

Ericsson, "On initial access, RRM, mobility and RLM", 3GPP TSG-RAN WG1 Meeting #94, Gothenburg, Sweden, R1-1809205, Aug. 20-24, 2018, 1-9.

Mediatek Inc., "Paging Frame and Paging Occasion Calculation in NR", 3GPP TSG-RAN WG2 Meeting #102, R2-1807743, Busan, South Korea, May 21-25, 2018, 1-6.

Qualcomm Incorporated, "Paging Occasion Calculation for NR", 3GPP TSG-RAN WG2 Meeting #101bis, R2-1804999, Sanya, China, Apr. 16-20, 2018, 1-6.

Samsung, "Reference Frame & PO Determination for Paging Reception", 3GPP TSG-RAN2 101bis, R2-1804312, Sanya, China, Apr. 16-Apr. 20, 2018, 1-6.

Samsung, "Reference Frame & PO Determination: Non Default Association", 3GPP TSG-RAN2 102, R2-1807689, Busan, South Korea, May 21-May 25, 2018, 1-7.

EPO Communication and Supplemental Search Report dated Aug. 12, 2021 for Patent Application No. 19846710.2, consisting of 4-pages.

3GPP TSG-RAN WG2 #99bis Tdoc R2-1711369; Title: Configuration of paging transmissions in multi-beam operation; Agenda Item: 10.4.4.6; Source: Ericsson; Document for: Discussion, Decision; Date and Location: Oct. 9-13, 2017, Prague, Czech Republic, consisting of 4-pages.

3GPP TSG-RAN WG2 Meeting #101bis R2-1804882; Title: Misalignment of CSS in PBCH and dedicated signaling; Agenda Item: 10.4.1.3.1.1; Source: Vivo; Document for: Discussion and Decision; Date and Location: Apr. 16-20, 2018, Sanya, China, consisting of 8-pages.

3GPP TSG-RAN WG2 AH 1807 Tdoc R2-1809723; Title: Configuration of POs within a PF; Agenda Item: 10.4.5.5; Source: Ericsson; Document for: Discussion, Decision; Date and Location: Jul. 2-6, 2018, Montreal, Canada, consisting of 5-pages.

Indian Office Action dated Jan. 1, 2022 for Patent Application No. 202117000107, consisting of 6-pages.

* cited by examiner

FIGURE 1A

USING DUAL-SLOT PDCCH MONITORING PATTERN FOR PAGING OCCASION COINCIDING WITH SYNCHRONIZATION SIGNAL BURST SET

TECHNICAL FIELD

The present disclosure relates, in general, to wireless communications and, more particularly, systems and methods for using dual-slot physical downlink control channel (PDCCH) monitoring pattern for paging occasion coinciding with synchronization signal burst set.

BACKGROUND

New radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

An important property of the coming 5G system (e.g. NR), which is relevant also in the context of the present disclosure, is the usage of high carrier frequencies such as, for example, those in the range 24.25-52.6 GHz. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency such that, for example, the link budget would be worse for the same link distance even in a free space scenario if omnidirectional receive and transmit antennas are used. This motivates the usage of beamforming to compensate for the loss of link budget in high frequency spectrum. This is particularly important when communicating with UEs with poor receivers such as, for example, low cost/low complexity UEs. Other means for improving the link budget include repetition of the transmissions to allow wide beam or omnidirectional transmission, for example, or use of Single Frequency Network transmission from multiple TRPs in the same or different cells.

Due to the above described properties, in the high frequency bands, many downlink signals, such as synchronization signals, system information, and paging, which need to cover a certain area (i.e. not just targeting a single UE with known location/direction) such as, for example, a cell, are expected to be transmitted using beam sweeping, which may include transmitting the signal in one beam at a time, sequentially changing the direction and coverage area of the beam until the entire intended coverage area, e.g. the cell, has been covered by the transmission.

The signals and channels in NR which correspond to the primary synchronization signal (PSS), secondary synchronization signal (SSS), cell-specific reference signal (CRS) and physical broadcast channel (PBCH) (which carries the master information block (MIB) and layer 1 generated bits) in LTE, i.e. PSS, SSS, demodulation reference signal (DMRS) for PBCH and PBCH (sometimes referred to as NR-PSS, NR-SSS, DMRS for NR-PBCH and NR-PBCH in NR) are put together in an entity/structure denoted synchronization signal block (SSB or SS Block) or, with other terminology, SS/PBCH block (the term SS Block is typically used in RAN2 while RAN1 usually uses the term SS/PBCH block). Hence, SS Block, SSB and SS/PBCH block are three synonyms (although SSB is really an abbreviation of SS Block). The PSS+SSS enables a UE to synchronize with the cell and also carries information from which the Physical Cell Identity (PCI) can be derived. The PBCH part (including DMRS) of the SSB carries a part of the system information denoted MIB (Master Information Block) or NR-MIB, 8 layer-one generated bits and the SSB index within the SS Burst Set. In high frequencies, SS Blocks will be transmitted periodically using beam sweeping. Multiple such beamformed SS Block transmissions are grouped into an SS Burst Set which constitutes a full beam sweep of SS Block transmissions. When many beams are used, longer gaps such as, for example, 2 or 4 slots (where each slot contains 14 OFDM symbols) are be inserted into the beam sweep. This effectively creates groups of SS Block transmissions within the SS Burst Set, which, using an obsolete term, could be referred to as SS Bursts.

In NR, the system information (SI) is divided into the two main parts "Minimum SI" (MSI) and "Other SI" (OSI). The MSI is always periodically broadcast, whereas the OSI may be periodically broadcast or may be available on-demand (and different parts of the OSI may be treated differently). The MSI consists of the MIB and System Information Block type 1 (SIB1), where SIB1 is also referred to as Remaining Minimum System Information (RMSI) (the term SIB1 is typically used by RAN2 while RAN1 usually uses the term RMSI). RAN1, RAN2, RAN3 and RAN4 are 3GPP working groups, more formally referred to as TSG-RAN WG1, TSG-RAN WG2, TSG-RAN WG3 and TSG-RAN WG4.

SIB1/RMSI is periodically broadcast using a physical downlink control channel (PDCCH)/physical data shared channel (PDSCH)-like channel structure, i.e. with a scheduling allocation transmitted on the PDCCH (or NR-PDCCH), allocating transmission resources on the PDSCH (or NR-PDSCH), where the actual RMSI is transmitted. The MIB contains information that allows a user equipment (UE) to find and decode RMSI/SIB1. More specifically, configuration parameters for the PDCCH utilized for the RMSI/SIB1 is provided in the MIB (when an associated RMSI/SIB1 exists), possibly complemented by parameters derived from the PCI. A further 3GPP agreement for release 15 concerning RMSI transmission is that the RMSI/SIB1 transmissions should be spatially Quasi Co-Located (QCL) with the SS Block transmissions. A consequence of the QCL property is that the PSS/SSS transmission can be relied on for accurate synchronization to be used when receiving the PDCCH/PDSCH carrying the RMSI/SIB1.

Paging and OSI are also transmitted using the PDCCH+PDSCH principle with PDSCH DL scheduling allocation on the PDCCH and Paging message or SI message on the PDSCH. An exception to this is that paging information may optionally be conveyed in the paging DCI on the PDCCH, thus skipping the Paging message on the PDSCH. For release 15, this has been agreed to be used when paging is used for notification of ETWS, CMAS or SI update. For future releases, it is possible that other paging cases may utilize this PDCCH only transmission mechanism. The configuration information for the PDCCH used for paging and the PDCCH used for OSI transmission is included in the RMSI/SIB1. For both paging and OSI, the same CORESET (i.e. the control resource set for Type0-PDCCH common search space) may be used as for RMSI/SIB1 if the UE is not provided by dedicated higher layer signaling with a control resource set for Type0A-PDCCH common search space (for OSI) or for Type2-PDCCH common search space (for paging). In the RMSI/SIB1 for a Primary Cell or in dedicated signaling for other serving cells (as specified in 3GPP TS 38.331), the search space (i.e. the time windows and time repetition pattern) for paging is indicated in the pagingSearchSpace parameter while the OSI search space is indicated in the searchSpaceOtherSystemInformation parameter (which corresponds to the SearchSpace-OSI parameter in 3GPP TS 38.213). If the configuration information for the PDCCH for paging is not available in the RMSI/SIB1 or dedicate signaling (i.e. if the pagingSearchSpace parameter is not present in the RMSI/SIB1 or not signaled via dedicated signaling), then the monitoring windows/monitoring occasions for the PDCCH (i.e. essentially the search space) are the same as those configured for RMSI/SIB1.

It may be noted that the pagingSearchSpace parameter contains a SearchSpaceId, which points out a set of parameters which constitute a PDCCH search space configuration. This complexity is henceforth overlooked herein and the term pagingSearchSpace is henceforth used to refer to the set of parameters that configure the PDCCH search space for paging.

Paging is an essential function in a mobile telecommunications system. It is used to let the network contact a UE while in RRC_IDLE or RRC_INACTIVE (see further below) state, primarily in order to transmit downlink data to the UE, once the UE has responded to the page. Paging can also be used to inform UEs of updates of the system information in a cell. It can also be used for informing UEs of an ongoing public warning such as ETWS or CMAS.

In LTE, a UE in RRC_IDLE state camps on a cell and while camping monitors the paging channel associated with that cell. The UE is configured to monitor repeatedly occurring paging occasions and may reside in a DRX sleep mode in between the paging occasions. When the UE is paged at such a paging occasion, the paging is indicated on the PDCCH in the form of a DL scheduling allocation addressed to the P-RNTI (which is shared by all UEs). This DL scheduling allocation indicates the DL transmission resources on the PDSCH, where the actual Paging message is transmitted. A UE in RRC_IDLE state, which receives a DL scheduling allocation addressed to the P-RNTI at one of the UE's paging occasions, receives and reads the Paging message from the allocated DL transmission resources to find out whether the Paging message is intended for the UE. The UE(s) that is(are) subject to the paging is(are) indicated in the Paging message through one or more UE paging identifiers (S-TMSI or IMSI), wherein each UE paging identifier is included in a paging record. Up to 16 UEs may be addressed, i.e. there may be up to 16 paging records in one Paging message.

Most of these paging principles and mechanisms are reused in NR. However, in NR a new state is introduced, denoted RRC_INACTIVE state, for which paging is also relevant. 3GPP has decided to specify a similar RRC_INACTIVE state for LTE, but this has not been done yet.

The purpose of introducing the RRC_INACTIVE state in addition to the RRC_IDLE state is to introduce a low-energy state with reduced signaling overhead over the radio and network interfaces and improved UE access latency as well as UE energy consumption when the UE moves from an energy saving state to a state designed for transmission and reception of user data (i.e. RRC_CONNECTED state). In this state, the core network still regards the UE as connected and thus the RAN-CN connection is kept active, while the RRC connection between the gNB and the UE is released. The UE's RAN context is maintained in the anchor gNB and the RAN-CN connection is maintained between the anchor gNB and the core network. In order to reduce radio interface signaling at connection establishment, the context information is kept active in the UE and in the anchor gNB which enables the UE to resume the RRC connection when it is paged from the RAN or has UL data or signaling to send. In this state, the UE can move around in a RAN Notification Area (RNA) without informing the network of its whereabouts, but as soon as it leaves its configured RNA, it informs the network. In NR, paging can thus be used for a UE in either RRC_IDLE state or RRC_INACTIVE state. In RRC_IDLE state, the paging is initiated by the CN, while paging of a UE in RRC_INACTIVE state is initiated by the RAN (the anchor gNB).

A UE in RRC_INACTIVE state must be prepared to receive paging initiated by either the RAN or the CN. Normally, paging of a UE in RRC_INACTIVE state is initiated by the RAN, but in cases of state mismatch between the UE and the CN, the CN may initiate paging of a UE that considers itself to be in RRC_INACTIVE state.

For CN initiated paging, the UE ID used in the Paging message is the 5G-S-TMSI in NR (replacing the S-TMSI that is used in LTE). The IMSI is used only in rare error cases where the 5G-S-TMSI is not available. For RAN initiated paging, the UE ID used in the Paging message is the I-RNTI (which is assigned by the anchor gNB). The same Paging message is used over the radio interface for both CN initiated and RAN initiated paging, so the type of UE ID is what informs the UE of whether the CN or the RAN initiated the page. The UE needs to know this since it is expected to act differently depending on which entity that initiated the page. In response to CN initiated paging (excluding ETWS/CMAS/SI update notification), the UE is expected to contact the network (through random access) and request establishment of a new RRC connection (including a NAS Service Request message). In response to RAN initiated paging (excluding ETWS/CMAS/SI update notification), the UE is expected to contact the network (through random access) and request to resume an existing (suspended) RRC connection. Another difference between LTE and NR is that the maximum number of UE IDs (i.e. paging records) that may be included in a Paging message will be increased from 16 in LTE to 32, in NR.

As mentioned above, in NR, paging has to be transmitted using beamforming transmission on high carrier frequencies such as, for example, multi-GHz frequencies, especially on really high frequencies, such as frequencies above 20 GHz and hence beam sweeping has to be used to cover an entire cell with the page. To support beam sweeping of paging transmissions, a paging occasion (PO) in NR can consist of multiple timeslots to accommodate all the paging transmissions of the beam sweep. This is configured in the system information.

Thus, a paging occasion is a regularly recurring time window during which paging may be transmitted. Different UEs can be allocated to different POs, and a UE is expected to monitor the paging channel (i.e. the PDCCH configured for paging) during its allocated PO. A radio frame that contains one or more PO(s) is denoted Paging Frame (PF).

In both LTE and NR, the time interval between two POs for a certain UE is governed by a paging DRX cycle (henceforth referred to as "DRX cycle"). There is one PO allocated to the UE during each DRX cycle (the UE is aware of all POs, but "selects" one based on its UE ID). Unless the UE is configured with an extended DRX (eDRX) cycle, the DRX cycle a UE uses is the shortest of the default DRX cycle (also referred to as the default paging cycle), which is announced in the system information (then denoted default-PagingCycle), or a UE specific DRX cycle negotiated with the CN. For regular UEs (i.e. UEs which are not configured with any type of extended DRX (eDRX) cycle), the shortest of the default DRX cycle and the UE specific DRX cycle (if available) is used. In NR, a UE can also be configured with a DRX cycle to be used in RRC_INACTIVE state. This DRX cycle is assigned to the UE when the UE is moved to RRC_INACTIVE state.

Within the DRX cycle, a UE calculates a PF and which out of possibly multiple (1, 2 or 4 in LTE) PO(s) in the PF it should monitor based on its UE ID. In LTE, IMSI mod 1024 is used for this calculation, This has also been agreed for NR. However, due to security/privacy issues related to the use of the IMSI for this purpose, it is possible that the agreement for NR will be changed and the IMSI will be replaced by the 5G-S-TMSI in this formula.

In LTE, the PFs for a UE are the radio frames with System Frame Numbers (SFN) satisfying the following equation:

$$SFN \bmod T = (T \text{ div } N)*(UE\_ID \bmod N)$$

where . . .
- T: DRX cycle (default or UE specific)
- N: min(T, nB) (I.e., N is the number of PFs in a DRX cycle.)
- nB: 4T, 2T, T, T/2, T/4, T/8, T/16, T/32, T/64, T/128, T/256 (the number of POs in a DRX cycle)
- UE_ID: IMSI mod 1024

The nB values T/64, T/128 and T/256 were added in release 15 of LTE. It has been suggested to restrict the nB values to 4T, 2T, T, T/2, T/4, T/8 and T/16 in NR release 15, but lately it was agreed to remove the nB parameter from the PF/PO algorithm of NR and instead make the N and Ns parameters independently configurable in the system information.

This formula will likely be reused in NR, possibly with some modification. One proposed modification is to introduce an offset for shifting of PFs, which would result in the following slightly modified formula for PF calculation (with the definitions of T, N, nB and UE_ID unchanged):

$$(SFN+PF\_offset) \bmod T = (T \text{ div } N)*(UE\_ID \bmod N)$$

Within a PF, the PO(s) is/are configured/allocated based on a table in LTE, where the UE ID determines which of the PO(s) a UE should monitor. In detail, this LTE algorithm is as follows:

The subframe, which constitutes a UE's PO within a PF is determined by the following table:

| Ns | PO (i.e. subframe) when i_s = 0 | PO (i.e. subframe) when i_s = 1 | PO (i.e. subframe) when i_s = 2 | PO (i.e. subframe) when i_s = 3 |
|---|---|---|---|---|
| 1 | 9 | N/A | N/A | N/A |
| 2 | 4 | 9 | N/A | N/A |
| 4 | 0 | 4 | 5 | 9 | where the parameters in the table above are:
- Ns: max(1, nB/T) (I.e., Ns is the number of POs in a PF.)
- i_s: floor(UE_ID/N) mod Ns (i_s is an index pointing out a certain UE's PO within a PF.)

As can be understood from the above algorithm and table, i_s is an index that points out which of the PO(s) in a PF a UE should use, wherein the PO(s) are indexed (i.e. i_s has the range) from 0 to Ns−1. The table determines the allocation of PO(s) to subframe(s) within a PF.

The above is, thus, the LTE algorithm for configuration of POs in a PF, which is also the baseline for NR, but as will be explained further below, this algorithm is not fully suitable for NR and will not be reused in its entirety in NR.

In the context of the disclosure herein, it is also relevant to describe a difference in the time domain structure of LI of the radio interface between LTE and NR. While LTE always has the same structure, NR has different structures, because it comprises different so-called numerologies (which essentially can be translated to different subcarrier spacings (SCSs) and consequent differences in the time domain, e.g. the length of an OFDM symbol). In LTE, the LI radio interface time domain structure consists of symbols, subframes and radio frames, where a 1 ms subframe consists of 14 symbols (12 if extended cyclic prefix is used) and 10 subframes form a 10 ms radio frame. In NR, the concepts of subframes and radio frames are reused in the sense that they represent the same time periods, i.e. 1 ms and 10 ms respectively, but their internal structures vary depending on the numerology. For this reason, the additional term "slot" is introduced in NR, which is a time domain structure that always contains 14 symbols (for normal cyclic prefix), irrespective of the symbol length. Hence, the number of slots and symbols comprised in a subframe and a radio frame vary with the numerology, but the number of symbols in a slot remains consistent. The numerologies and parameters are chosen such that a subframe always contains an integer number of slots (i.e. no partial slots).

Note that the choice of the term "slot" to refer to a set of 14 OFDM symbols in NR is somewhat unfortunate, since the term "slot" also exists in LTE, although in LTE it refers to half a subframe, i.e. 0.5 ms containing 7 OFDM symbols (or 6 OFDM symbols in when extended cyclic prefix is used).

Returning to the PO allocation, the table-based configuration/allocation used in LTE cannot be readily reused in NR. In LTE, it was simple to map a PO to a subframe and this could easily be done through the table specified for this purpose. However, in NR, a PO cannot simply be mapped to a subframe. In terms of transmission resources, a subframe is an unambiguous concept in LTE (with the only variation being normal or extended cyclic prefix). In NR, on the other hand, the transmission resources (in terms of slots and hence OFDM symbols) vary with different numerologies (i.e. subcarrier spacings, SCSs). In addition, the duration required for a PO in NR is variable and depends the number of beams needed in a possible beam sweep for the PDCCH for paging in combination with the SCS and consequent symbol length. For these reasons, the table-based PO configuration mechanism of LTE has been replaced by a mechanism based on the pagingSearchSpace in NR. The Ns and i_s parameters are retained, but they no longer point out subframes in a paging frame, but rather sets of PDCCH monitoring occasions (constituting PDCCH beam sweeps) in a PF.

In NR, two main cases are distinguished: the so-called default case and the non-default case. This refers to whether there is an explicit pagingSearchSpace parameter structure configured through the system information or dedicated signaling. If no such pagingSearchSpace parameter structure is available, a default allocation of the PO(s) within a PF is used. That is, in the default case, the PDCCH monitoring occasions corresponding to the PO(s) within a PF are determined according to a default association in relation to the SSB transmissions and these PDCCH monitoring occasions are then the same as for the RMSI as defined in section 13 in 3GPP TS 38.213. For the default case, there can be 1 or 2 PO(s) in a PF (i.e. Ns can be equal to 1 or 2). If there are 2 POs in the PF, there is one PO in the first half frame (corresponding to i_s=0) and one PO in the second half frame (corresponding to i_s=1).

For the non-default case (i.e. with the pagingSearchSpace explicitly configured and the pagingSearchSpace parameter included in the RMSI/SIB1 or dedicated signaling), a different approach is suggested in R2-1807689, "Reference Frame & PO Determination: Non Default Association", contribution by Samsung to 3GPP TSG-RAN WG2 meeting #102 in Busan, South Korea, May 21-May 25, 2018 (hereinafter, R2-1807689).

Here it is proposed (the essence of which is adopted in the text currently proposed for TS 38.304) to utilize the pagingSearchSpace parameter structure (i.e. the parameters pointed out by the SearchSpaceId of the pagingSearchSpace parameter) to define POs within a PF.

The pagingSearchSpace configures a time domain pattern for so-called PDCCH monitoring occasions, at which a UE should monitor the PDCCH for paging transmissions (i.e. a DCI with a CRC scrambled with the P-RNTI) in the Control Resource Set (CORESET) configured for paging, which is associated with the pagingSearchSpace. The pagingSearchSpace is one instance of the SearchSpace IE (as defined in TS 38.331) and it contains the following parameters that define the time domain pattern for the PDCCH monitoring occasions:

monitoringSlotPeriodicityAndOffset: This parameter defines a combination of periodicity and offset for slots containing PDCCH monitoring occasions. The two "parts" will henceforth often be referred to as the "monitoring slot periodicity" and the "monitoring slot offset". A slot containing one or more PDCCH monitoring occasion(s) is denoted "monitoring slot".

monitoringSymbolsWithinSlot: This parameter configures a pattern of OFDM symbol(s) within a slot, where each indicated symbol is the first symbol of a PDCCH monitoring occasion, i.e. the first of a set of consecutive symbols in which the UE should monitor the CORESET associated with the PDCCH for paging. The length of each PDCCH monitoring occasion in terms of symbols is determined by the length of the associated CORESET. That is, starting from an OFDM symbol indicated by the monitoringSymbolsWithinSlot parameter, a PDCCH monitoring occasion consists of a set of M consecutive OFDM symbols, where M is equal to the duration (in symbols) of the CORESET associated with the pagingSearchSpace. The monitoringSymbolsWithinSlot parameter is a bitmap (or bit string) where each bit corresponds to a symbol in a slot. The most significant bit corresponds to the first symbol in the slot. A bit set to 1 indicates that the corresponding symbol is the first symbol of a PDCCH monitoring occasion. An OFDM symbol in which the UE should monitor the CORESET associated with the PDCCH for paging (i.e. an OFDM symbol belonging to a PDCCH monitoring occasion) is denoted "monitoring symbol". (An alternative use and interpretation of the monitoringSymbolsWithinSlot parameter is that it indicates all symbols (i.e. sets the corresponding bits to one) belonging to a PDCCH monitoring occasion, i.e. not just the first symbol of the PDCCH monitoring occasion. With this use and interpretation, each PDCCH monitoring occasion is indicated in the monitoringSymbolsWithinSlot parameter by setting the corresponding group of consecutive bits to 1, wherein the number of set bits is the same as the length of the CORESET associated with the PDCCH for paging.)

duration: This parameter defines a number of consecutive slots in which the monitoring symbol pattern of the monitoringSymbolsWithinSlot parameter is repeated. The duration parameter thus configures a group of monitoring slots (with the same monitoring symbol pattern) starting at the slot defined by the monitoring slot offset part of the monitoringSlotPeriodicityAndOffset parameter. The group of monitoring slots is repeated with the periodicity defined by the monitoring slot periodicity part of the monitoringSlotPeriodicityAndOffset parameter. For instance, if the monitoring slot offset=0, the monitoring slot periodicity=4 and duration=2, then the UE applies the PDCCH monitoring symbol pattern of the monitoringSymbolsWithinSlot parameter in slots 0, 1, 4, 5, 8, 9 . . . This slot numbering starts at the first slot in the first radio frame in the system frame number range, i.e. a radio frame with system frame number (SFN) 0.

These parameters have the following ASN.1 specifications in 3GPP TS 38.331:

```
-- ASN1START
-- TAG-SEARCHSPACE-START
SearchSpace ::=                      SEQUENCE {
    searchSpaceId                        SearchSpaceId,
    controlResourceSetId                 ControlResourceSetId        OPTIONAL, --
Cond SetupOnly
    monitoringSlotPeriodicityAndOffset   CHOICE {
        sl1                                  NULL,
        sl2                                  INTEGER (0..1),
        sl4                                  INTEGER (0..3),
        sl5                                  INTEGER (0..4),
        sl8                                  INTEGER (0..7),
        sl10                                 INTEGER (0..9),
        sl16                                 INTEGER (0..15),
        sl20                                 INTEGER (0..19),
        sl40                                 INTEGER (0..39),
        sl80                                 INTEGER (0..79),
        sl160                                INTEGER (0..159),
        sl320                                INTEGER (0..319),
        sl640                                INTEGER (0..639),
```

-continued

```
        s11280                  INTEGER (0..1279),
        s12560                  INTEGER (0..2559)
    }                                                   OPTIONAL,   --
Cond Setup
        duration                INTEGER (2..2559)       OPTIONAL,   --
Need R
        monitoringSymbolsWithinSlot  BIT STRING (SIZE (14))  OPTIONAL,   --
Cond Setup
        :
        :
        :

}
-- TAG-SEARCHSPACE-STOP
-- ASN1STOP
```

It may be noted that in previous versions of TS 38.213, different corresponding parameter names were used. The pagingSearchSpace in TS 38.331 corresponded to the paging-SearchSpace in TS 38.213. The monitoringSlotPeriodicityAndOffset parameter in TS 38.331 corresponded to the Monitoring-periodicity-PDCCH-slot and Monitoring-offset-PDCCH-slot parameters in TS 38.213 and the monitoring-SymbolsWithinSlot parameter in TS 38.331 corresponded to the Monitoring-symbols-PDCCH-within-slot parameter in 3GPP TS 38.213. In version 15.2.0 of TS 38.213, the parameter names used in TS 38.331 have been adopted.

The CORESET indicates the DL transmission resources a UE should monitor during a PDCCH monitoring occasion. More specifically, a CORESET indicates a set of PRBs in the frequency domain and 1-3 consecutive OFDM symbols in the time domain. The length of a PDCCH monitoring occasion is thus defined by the length (number of OFDM symbols) of the CORESET. For instance, if the length of the CORESET is 3 symbols and the monitoringSymbolsWithinSlot parameter (which is a bitmap) indicates the second symbol of a slot as the first symbol of a PDCCH monitoring occasion, then the UE should monitor the CORESET in the second, third and fourth symbol of the slot. Furthermore, as mentioned above, each of those OFDM symbols is denoted "monitoring symbol" or "monitoring OFDM symbol" and a slot containing at least one monitoring symbol is denoted "monitoring slot". The CORESET associated with the PDCCH for paging is indicated by the controlResourceSetId parameter in the above ASN.1 SearchSpace definition.

With the alternative use and interpretation of the monitoringSymbolsWithinSlot parameter, i.e. that it indicates all symbols of each PDCCH monitoring occasion, the UE may still depend on the length of the CORESET to determine the duration of a PDCCH monitoring occasion. For instance, if the length of the CORESET is 3 symbols and the monitoringSymbolsWithinSlot parameter indicates that 6 consecutive symbols belong to PDCCH monitoring occasions, then the UE can deduce from the duration of the CORESET, i.e. 3 symbols in this example, that the 6 indicated consecutive symbols must consist of two groups of three consecutive symbols, wherein each of the two groups constitute a PDCCH monitoring occasion in which the CORESET should be monitored.

Further details on the use of the search space parameters can be found in TS 38.213, where the following is stated in section 10.1 (in version 15.1.0 of the specification):

For search space set s in control resource set p, the UE determines that a PDCCH monitoring occasion(s) exists in a slot with number $n_{s,f}^{\mu}$ [4, TS 38.211] in a frame with number $n_f$ if $(n_f N_{slot}^{frame,\mu} + n_{s,f}^{\mu} - o_{p,s}) \bmod k_{p,s} = 0$.

In this formula $k_{p,s}$ is the monitoring slot periodicity, $o_{p,s}$ is the monitoring slot offset and the other parameters are defined in TS 38.211 as follows:

$N_{slot}^{frame,\mu}$ Number of slots per frame for subcarrier spacing configuration $\mu$ (see clause 4.3.2 in TS 38.211)

$n_{s,f}^{\mu}$ Slot number within a frame for subcarrier spacing configuration $\mu$ (see clause 4.3.2 in TS 38.211)

$\mu$ Subcarrier spacing configuration, $\Delta f = 2^{\mu} \cdot 15$ [kHz]

The proposal in R2-1807689 is that each paging beam transmission matches one PDCCH monitoring occasion, as defined by the pagingSearchSpace and that, assuming $N_{beams}$ beams, the first $N_{beams}$ PDCCH monitoring occasions in the PF constitute the first PO in the PF, the subsequent $N_{beams}$ PDCCH monitoring occasions in the PF constitute the second PO in the PF, etc. This has then been modified (according to agreements at the 3GPP TSG-RAN WG2 ad hoc 1807 meeting in Montreal in July 2018) to exclude PDCCH monitoring occasions that conflict with UL slots/symbols (in TDD operation). The remaining PDCCH monitoring occasions are called "useful paging PDCCH monitoring occasions" and the $N_{beams}$ parameter would then count useful paging PDCCH monitoring occasions rather than all configured PDCCH monitoring occasions.

The proposal in R2-1807689 has to some extent been captured in the likely to be agreed text related to paging in the current draft of 3GPP TS 38.304 for 3GPP release 15. However, it has been modified by later by the agreements below (from the 3GPP TSG-RAN WG2 ad hoc 1807 meeting in Montreal in July 2018) with regards to the exact mapping between PDCCH monitoring occasions and the beams of a PDCCH beam sweep. During the 3GPP TSG-RAN WG2 ad hoc 1807 meeting, it was further agreed to remove the restriction that multiple POs per PF can be configured only when all radio frames are PFs. To this end, it was agreed that the nB parameter would no longer be used and that Ns (which is the number of POs per PF) and N (which is the number of PFs in a paging DRX cycle) would be configurable independently of each other (agreement 3 below) and provided in the system information. The following is a list of paging related agreements from the 3GPP TSG-RAN WG2 ad hoc 1807 meeting in Montreal in July 2018:

Agreements:

0 Define a useful paging PDCCH monitoring occasion as a monitoring occasion doesn't conflict with UL slots/symbols.

1 For non-default association, one PO comprises of 'N' useful paging PDCCH monitoring occasion where 'N' is equal to number of actual transmitted SSBs. RAN2 understanding is that the Kth monitoring occasion in the PO is corresponded to the Kth transmitted SSB.

2 For non-default association, $(i\_s+1)^{th}$ PO is a set of N consecutive useful paging PDCCH monitoring occasions for paging starting from the $(i\_s*N)^{th}$ PDCCH monitoring occasion. The useful paging PDCCH monitoring occasions starting from 1st useful paging PDCCH monitoring occasion for paging in the paging frame are sequentially numbered from zero. FFS the necessity to introduce additional parameter to indicate the first PDCCH monitoring occasion of each PO in a PF.

3 Support to configure Ns and N value instead of nB.

At the 3GPP TSG-RAN WG2 ad hoc 1807 meeting it was also agreed to increase the maximum number of UE IDs (i.e. paging records) that can be included in a Paging message from 16 in LTE to 32 in NR.

The following is a copy of the current (expected to be agreed) text in section 7.1 "Discontinuous Reception for Paging" in 3GPP TS 38.304 (the above agreements are captured although the term "useful paging PDCCH monitoring occasion" is not used in the text):

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent [4]. One Paging Frame (PF) is one Radio Frame and may contain one or multiple PO(s) or starting point of a PO.

In multi-beam operations, the length of one PO is one period of beam sweeping and the UE can assume that the same paging message is repeated in all beams of the sweeping pattern and thus the selection of the beam(s) for the reception of the paging message is up to UE implementation. The paging message is same for both RAN initiated paging and CN initiated paging.

The UE initiates RRC Connection Resume procedure upon receiving RAN paging. If the UE receives a CN initiated paging in RRC_INACTIVE state, the UE moves to RRC_IDLE and informs NAS.

PF, PO are determined by the following formulae:
SFN for the PF is determined by:

$(SFN+PF\_offset) \mod T = (T \div N)*(UE\_ID \mod N)$

Index (i_s), indicating the start of a set of PDCCH monitoring occasions for the paging DCI, is determined by:

$i\_s = \text{floor}(UE\_ID/N) \mod Ns$

The PDCCH monitoring occasions for paging are determined according to paging-SearchSpace if configured. Otherwise, the PDCCH monitoring occasions for paging are determined according to the default association (i.e. PDCCH monitoring occasions for paging are same as for RMSI as defined in Section 13 in [4]).

For default association, Ns is either 1 or 2. For Ns=1, there is only one PO which starts in the PF. For Ns=2, PO is either in the first half frame (i_s=0) or the second half frame (i_s=1) of the PF.

For non-default association (i.e. when paging-SearchSpace is used), the UE monitors the $(i\_s+1)^{th}$ PO where the first PO starts in the PF. The PDCCH monitoring occasions for paging which are not overlapping with UL symbols are sequentially numbered from zero starting from the 1st PDCCH monitoring occasion for paging in the PF. The $(i\_s+1)^{th}$ PO is a set of 'S' consecutive PDCCH monitoring occasions for paging starting from the $(i\_s*S)^{th}$ PDCCH monitoring occasion for paging where 'S' is the number of actual transmitted SSBs determined according to ssb-PositionsInBurst in SystemInformationBlock1. The $K^{th}$ PDCCH monitoring occasion for paging in the PO corresponds to the $K^{th}$ transmitted SSB.

The following parameters are used for the calculation of PF and i_s above:
T: DRX cycle of the UE (T is determined by the shortest of the UE specific DRX value, if configured by RRC or upper layers, and a default DRX value broadcast in system information. If UE specific DRX is not configured by upper layers, the default value is applied)
N: number of total paging frames in T
Ns: number of paging occasions for a PF
PF_offset: offset used for PF determination
UE_ID: IMSI mod 1024

Parameters N, Ns, PF_offset, and the length of default DRX Cycle are signaled in SystemInformationBlock1.

If the UE has no IMSI, for instance when making an emergency call without USIM, the UE shall use as default identity UE_ID=0 in the PF and i_s formulas above.

IMSI is given as sequence of digits of type Integer (0 . . . 9). IMSI shall in the formulae above be interpreted as a decimal integer number, where the first digit given in the sequence represents the highest order digit.

For example:

IMSI=12 (digit1=1, digit2=2)

In the calculations, this shall be interpreted as the decimal integer "12", not "1×16+2=18".

Certain problems exist. For example, with the current PF/PO algorithm for the non-default case, PFs may or may not coincide with SSB frames (i.e. frames containing SS Burst Sets) and POs may or may not overlap/coincide with SS Burst Sets. If SS Burst Sets are more frequent than PFs, then either every PF will coincide with an SSB frame or no PF will coincide with an SSB frame. On the other hand, if PFs are more frequent than SS Burst Sets, then a mixture may occur where some PFs coincide with SSB frames and some do not. In the special case where all radio frames are PFs, such a mixture of PFs coinciding with SSB frames and PFs not coinciding with SSB frames cannot be avoided if the SS Burst Set periodicity is greater than 10 ms.

There will, thus, be scenarios where some PFs coincide with SSB frames and some PFs do not. Consequently, some POs will overlap—partly or fully (e.g. coinciding)—with SS Burst Sets, while other POs do not.

The possibility to let a PO coincide with SS Burst Set and transmit the paging transmissions, e.g. the PDCCH transmissions, frequency-multiplexed with the SSBs has been proposed as a feature with potential benefits from both a UE perspective and a network perspective. When the gNB uses analog TX beamforming and can only transmit in one beam direction at a time, transmitting paging transmissions frequency-multiplexed with SSBs is a way to efficiently utilize the DL transmission resources (which otherwise risk being wasted, unless the network opportunistically can schedule a DL transmission in the beam direction of the SSB transmission). From the UE's perspective, frequency-multiplexing of SSBs and paging transmissions, e.g. PDCCH transmissions (and/or PDSCH transmissions), allows the UE to receive the SSB—e.g. to acquire/tune DL synchronization—and the paging transmission simultaneously, thus allowing shorter wake time for the UE than if the SSB and the paging transmission have to be received separately (i.e. separated in time).

However, when some POs overlap (e.g. coincide) with SS Burst Sets, configuration of the paging transmission pattern, i.e. the PDCCH monitoring pattern becomes a problem. For a PO overlapping with a SS Burst Set, the paging transmissions (PDCCH and/or PDSCH) should be frequency-multiplexed with the SSB transmissions, in order to reap the above described benefits associated with POs overlapping/coinciding with SS Burst Sets. But, the currently specified pagingSearchSpace parameters do not allow configuration of a PDCCH monitoring pattern that matches the SSB transmission pattern in most SS Burst Set configurations. The problem is that the pagingSearchSpace parameters cannot configure different PDCCH monitoring patterns in different slots. Groups of slots with PDCCH monitoring occasions can be configured with one or more "empty" slot (i.e. a slot without any PDCCH monitoring) in between, but the same monitoring symbol pattern will be repeated in all slots containing PDCCH monitoring occasions.

Figure 1A:
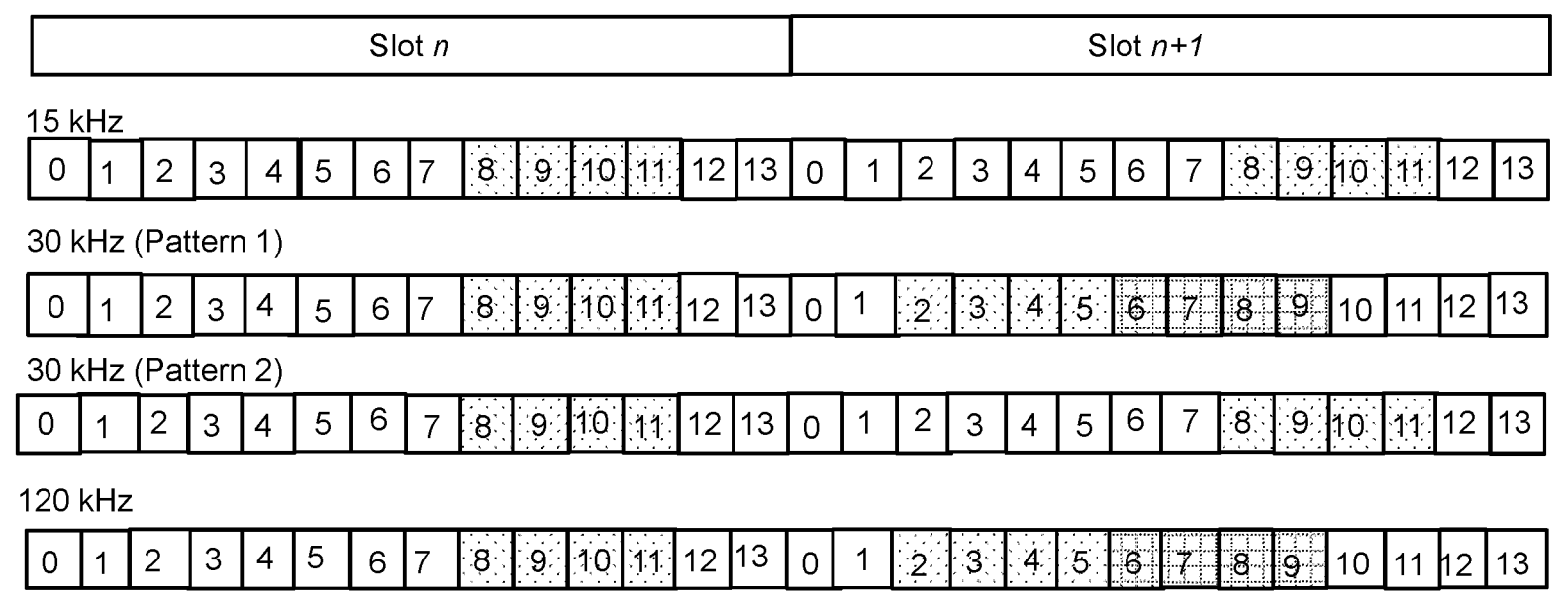

FIGS. 1A, 1B, and 2 illustrate the property of the pagingSearchSpace configuration not matching all the SSB transmission patterns in SS Burst Sets). Specifically, FIGS. 1A and 1B illustrate the SSB transmission patterns with OFDM symbol granularity for different subcarrier spacings with the numbers to the left. FIG. 2 illustrates SS Burst Set configurations, indicating the maximum numbers of SSBs, i.e., SSB positions, for SCS=120 kHZ and SCS=240 kHZ with slot granularity, where the OFDM slot structure with each slot is hidden.

As can be seen from FIGS. 1A and 1B, specifically, in SS Burst Sets containing more than two SSBs, different OFDM symbols are used for SSB transmissions in consecutive slots in most of the possible transmission patterns. These patterns cannot be matched by the pagingSearchSpace configuration, and thereby PO/paging configurations where the paging transmissions (PDCCH and/or PDSCH) are frequency-multiplexed with SSB transmissions are precluded.

The number of SSBs in an SS Burst Set is configurable up to a maximum number, L, which is carrier frequency dependent:

For frequency range up to 3 GHz, L=4
For frequency range from 3 GHz to 6 GHz, L=8
For frequency range from 6 GHz to 52.6 GHz, L=64

It may be noted that the SSBs in the transmission patterns illustrated in FIGS. 1A, 1B, and 2 should be seen as potential SSB "positions" and a network can be configured to utilize all or any subset of these SSB positions. This is configured in the ssb-PositionsInBurst IE in the ServingCellConfigCommon IE in SIB1.

SUMMARY

Certain aspects of the present disclosure and their embodiments may provide solutions to these or other challenges. For example, according to certain embodiments, to overcome the above described problem that the paging occasion (PO)/paging transmission configuration means available for the non-default case cannot be used to configure frequency-multiplexed transmission of paging (physical downlink control channel (PDCCH) and/or physical downlink shared channel (PDSCH)) and synchronization signal block (SSB), certain embodiments disclosed herein extend the set of pagingSearchSapce parameters to enable alternation between two different monitoring symbol patterns in subsequent slots, thereby enabling matching of the SSB transmission pattern of all possible SS Burst Set configurations.

According to certain embodiments, a method by a wireless device is provided for monitoring a PDCCH for paging messages. While monitoring the PDCCH for paging messages for a group of slots for a duration, the method includes initiating monitoring of one or more first PDCCH monitoring occasions in a first slot according to a first PDCCH monitoring parameter associated with a first monitoring symbol pattern and initiating monitoring of one or more second PDCCH monitoring occasions in a second slot according to a second PDCCH monitoring parameter associated with a second monitoring symbol pattern. The group of slots include at least the first slot and the second slot, and the second slot consecutively follows the first slot. The first monitoring symbol pattern is different from the second monitoring symbol pattern.

According to certain embodiments, a wireless device includes memory operable to store instructions and processing circuitry operable to execute the instructions to cause the wireless device to perform operations for a group of slots for a duration while monitoring the PDCCH for paging messages. According to a first PDCCH monitoring parameter associated with a first monitoring symbol pattern, the wireless device initiates monitoring of one or more first PDCCH monitoring occasions in a first slot. According to a second PDCCH monitoring parameter associated with a second monitoring symbol pattern, the wireless device initiates monitoring of one or more second PDCCH monitoring occasions in a second slot. The second slot consecutively follows the first slot, and the group of slots comprises at least the first slot and the second slot. The first monitoring symbol pattern is different from the second monitoring symbol pattern.

According to certain embodiments, a method in a network node is provided for configuring a wireless device to monitor a PDCCH for paging messages. The method includes transmitting, to a wireless device, a first PDCCH monitoring parameter associated with a first monitoring symbol pattern, which is for monitoring for paging messages in one or more first PDCCH monitoring occasions during a first slot of a group of slots during a duration. A second PDCCH monitoring parameter associated with a second monitoring symbol pattern is transmitted to the wireless device for monitoring for paging messages in one or more second PDCCH monitoring occasions during a second slot of the group of slots during the duration. The group of slots comprises at least the first slot and the second slot and the second slot consecutively follows the first slot. The first monitoring symbol pattern is different from the second monitoring symbol pattern.

According to certain embodiments, network node is provided for configuring a wireless device to monitor a PDCCH for paging messages. The network node includes memory operable to store instructions and processing circuitry operable to execute the instructions to cause the network node to transmit, to a wireless device, a first PDCCH monitoring parameter associated with a first monitoring symbol pattern, which is for monitoring for paging messages in one or more first PDCCH monitoring occasions during a first slot of a group of slots during a duration. A second PDCCH monitoring parameter associated with a second monitoring symbol pattern is transmitted to the wireless device for monitoring for paging messages in one or more second PDCCH monitoring occasions during a second slot of the group of slots during the duration. The group of slots comprises at least the first slot and the second slot and the second slot consecutively follows the first slot. The first monitoring symbol pattern is different from the second monitoring symbol pattern.

Certain embodiments may provide one or more of the following technical advantages. For example, one technical advantage may be that certain embodiments make it possible to configure paging transmissions frequency-multiplexed with SSB transmissions for all Synchronization Signal (SS) Burst Set configurations for the non-default case. Stated differently, certain embodiments enable configuration of paging transmissions frequency-multiplexed with SSB transmissions for all SS Burst Set configurations for the non-default case.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 1A and 1B illustrate the synchronization signal block (SSB) transmission patterns with orthogonal frequency division multiplexing (OFDM) symbol granularity for different subcarrier spacings;

DETAILED DESCRIPTION

Figure 1B:
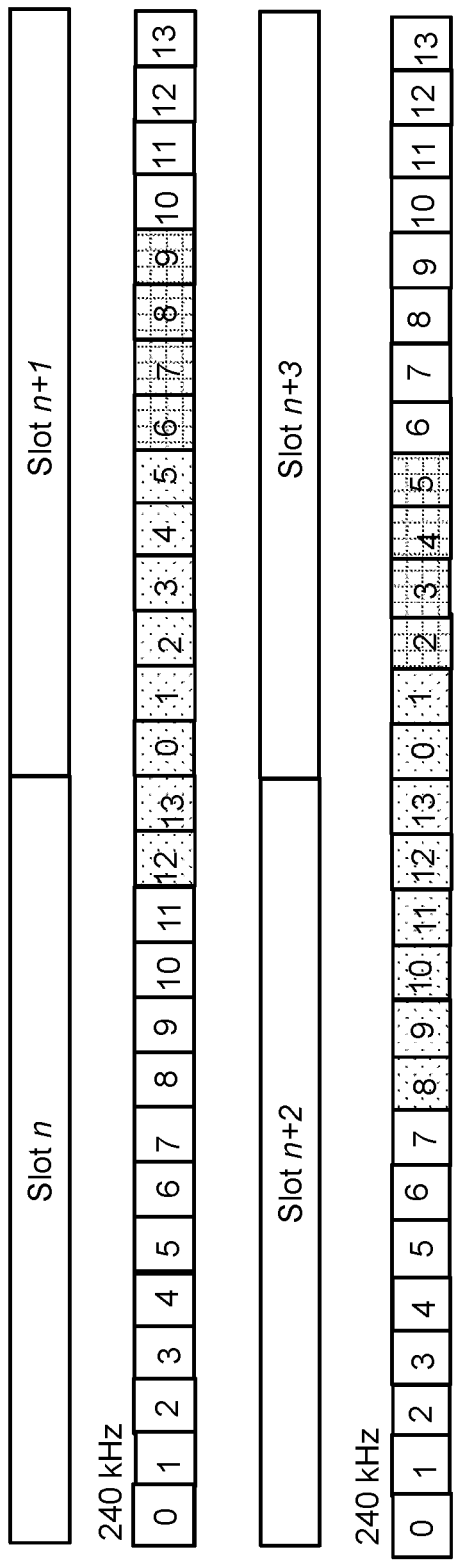
Figure 2:
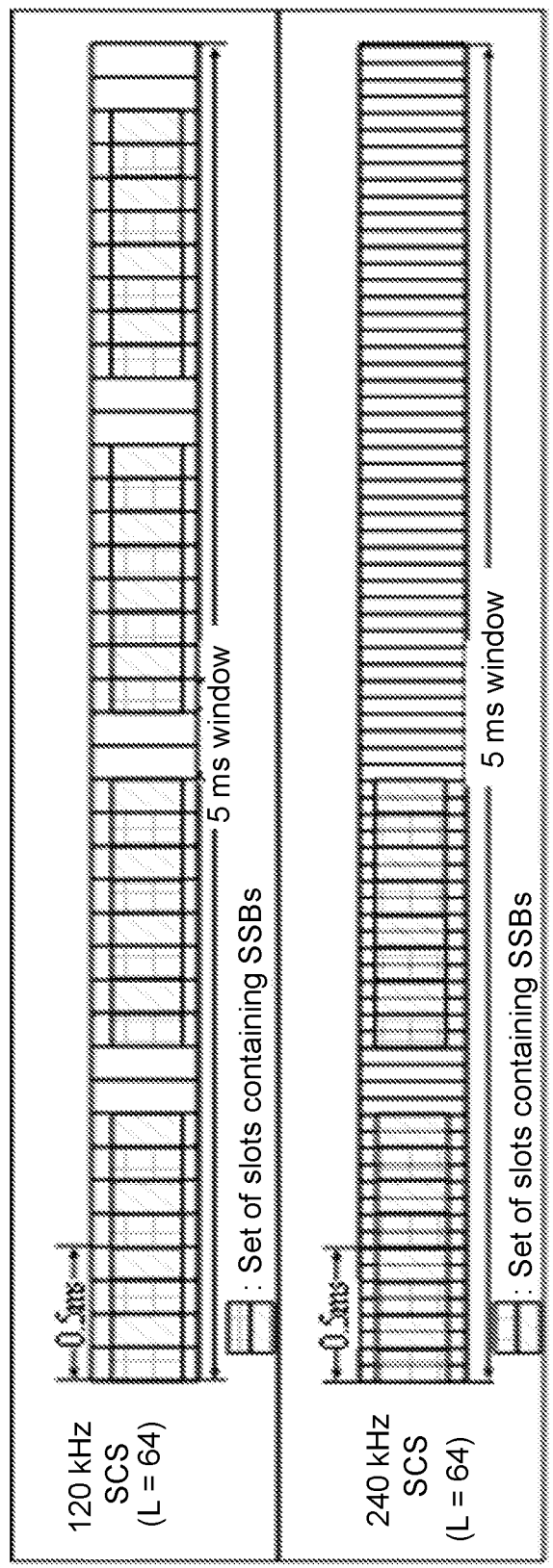
FIG. 2 illustrates synchronization signal (SS) Burst Set configurations, indicating the maximum numbers of SSB positions for SCS=120 kHZ and SCS=240 kHZ with slot granularity where the OFDM slot structure with each slot is hidden.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. According to certain embodiments, Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

To overcome the above described problem that the paging occasion (PO)/paging transmission configuration means available for the non-default case cannot be used to configure frequency-multiplexed transmission of paging (physical downlink control channel (PDCCH) and/or physical downlink shared channel (PDSCH)) and synchronization signal block (SSB), it is proposed to extend the set of paging-SearchSapce parameters to enable alternation between two different monitoring symbol patterns in subsequent slots, thereby enabling matching of the SSB transmission pattern of all possible Synchronization Signal (SS) Burst Set configurations.

Currently, only one monitoring symbol pattern in a slot can be configured and this is done through the monitoringSymbolsWithinSlot parameter. The duration parameter allows repetition of this pattern a configurable number of slots, i.e. a group of slots, and the monitoring slot periodicity (as defined by the monitoringSlotPeriodicityAndOffset parameter) configures how frequently this group of slots (with the same monitoring symbol pattern per slot) is repeated. If the monitoring slot periodicity (as defined by the monitoringSlotPeriodicityAndOffset parameter) is set equal to the duration parameter, then the monitoring symbol pattern defined by the monitoringSymbolsWithinSlot parameter is repeated in every slot.

The problem here is the rigidness with the repetition of a single monitoring symbol pattern within a slot. The proposed solution is to introduce an additional parameter defining a second monitoring symbol pattern within a slot, e.g. denoted monitoringSymbolsWithinSlot2 (with the same format and syntax as the monitoringSymbolsWithinSlot parameter). The monitoring symbol pattern within a slot should alternate between the one defined by monitoringSymbolsWithinSlot and the one defined by monitoringSymbolsWithinSlot2 in every other slot for all the slots in a group of slots defined by the duration parameter. The first slot should have the monitoring symbol pattern defined by the monitoringSymbolsWithinSlot parameter, the second slot should have the monitoring symbol pattern defined by the (new) monitoringSymbolsWithinSlot2 parameter, the third slot (if any) should have the monitoring symbol pattern defined by the monitoringSymbolsWithinSlot parameter, the fourth slot (if any) should have the monitoring symbol pattern defined by the (new) monitoringSymbolsWithinSlot2 parameter, etc.

The monitoringSymbolsWithinSlot2 parameter should be a 14-bit long bitmap, just like the monitoringSymbolsWithinSlot parameter, and it should have the same format, syntax and interpretation. The monitoringSymbolsWithinSlot2 parameter could be optional, since it would not always be needed. The parameter is needed only if a PO coincides with an SS Burst Set and the SSB transmission pattern used for the SS Burst Set includes different orthogonal frequency division multiplexing (OFDM) symbols for consecutive slots such as illustrated in FIG. 1. If no PO coincides with an SS Burst Set, or if the SS Burst Set consists of no more than two SSB transmissions or if the SSB transmission pattern configured for the SS Burst Set includes the same OFDM symbols in consecutive slots then the monitoringSymbolsWithinSlot2 parameter is not needed and can be omitted. If the optional monitoringSymbolsWithinSlot2 parameter is omitted, the monitoring symbol pattern defined by the monitoringSymbolsWithinSlot parameter is used in all slots in a group of slots defined by the duration parameter.

With the introduction of the monitoringSymbolsWithinSlot2 parameter, the SearchSpace ASN.1 definition may be modified as follows:

```
-- ASN1START
-- TAG-SEARCHSPACE-START
SearchSpace ::=                          SEQUENCE {
    searchSpaceId                            SearchSpaceId,
    controlResourceSetId                     ControlResourceSetId    OPTIONAL, --
Cond SetupOnly
    monitoringSlotPeriodicityAndOffset       CHOICE {
        sl1                                      NULL,
        sl2                                      INTEGER (0..1),
        sl4                                      INTEGER (0..3),
        sl5                                      INTEGER (0..4),
        sl8                                      INTEGER (0..7),
        sl10                                     INTEGER (0..9),
        sl16                                     INTEGER (0..15),
        sl20                                     INTEGER (0..19),
        sl40                                     INTEGER (0..39),
        sl80                                     INTEGER (0..79),
        sl160                                    INTEGER (0..159),
        sl320                                    INTEGER (0..319),
        sl640                                    INTEGER (0..639),
        sl1280                                   INTEGER (0..1279),
        sl2560                                   INTEGER (0..2559)
```

|  |  |  |
|---|---|---|
| } |  | OPTIONAL, -- |
| Cond Setup |  |  |
| duration | INTEGER (2..2559) | OPTIONAL, -- |
| Need R |  |  |
| monitoringSymbolsWithinSlot | BIT STRING (SIZE (14)) | OPTIONAL, -- |
| Cond Setup |  |  |
| monitoringSymbolsWithinSlot2 | BIT STRING (SIZE (14)) | OPTIONAL, -- |
| Cond Setup |  |  |
| : | : |  |
| } |  |  |
| -- TAG-SEARCHSPACE-STOP |  |  |
| -- ASN1STOP |  |  |

Note that the optional monitoringSymbolsWithinSlot2 parameter would typically only be used for configuring of a search space to be associated with a PDCCH for paging. And even for paging, it would be useful only when POs coincide with a SS Burst Sets and the SSB transmission pattern used for the SS Burst Sets include different OFDM symbols for consecutive slots (which nevertheless may turn out to be a common deployment/configuration scenario).

Figure 3:
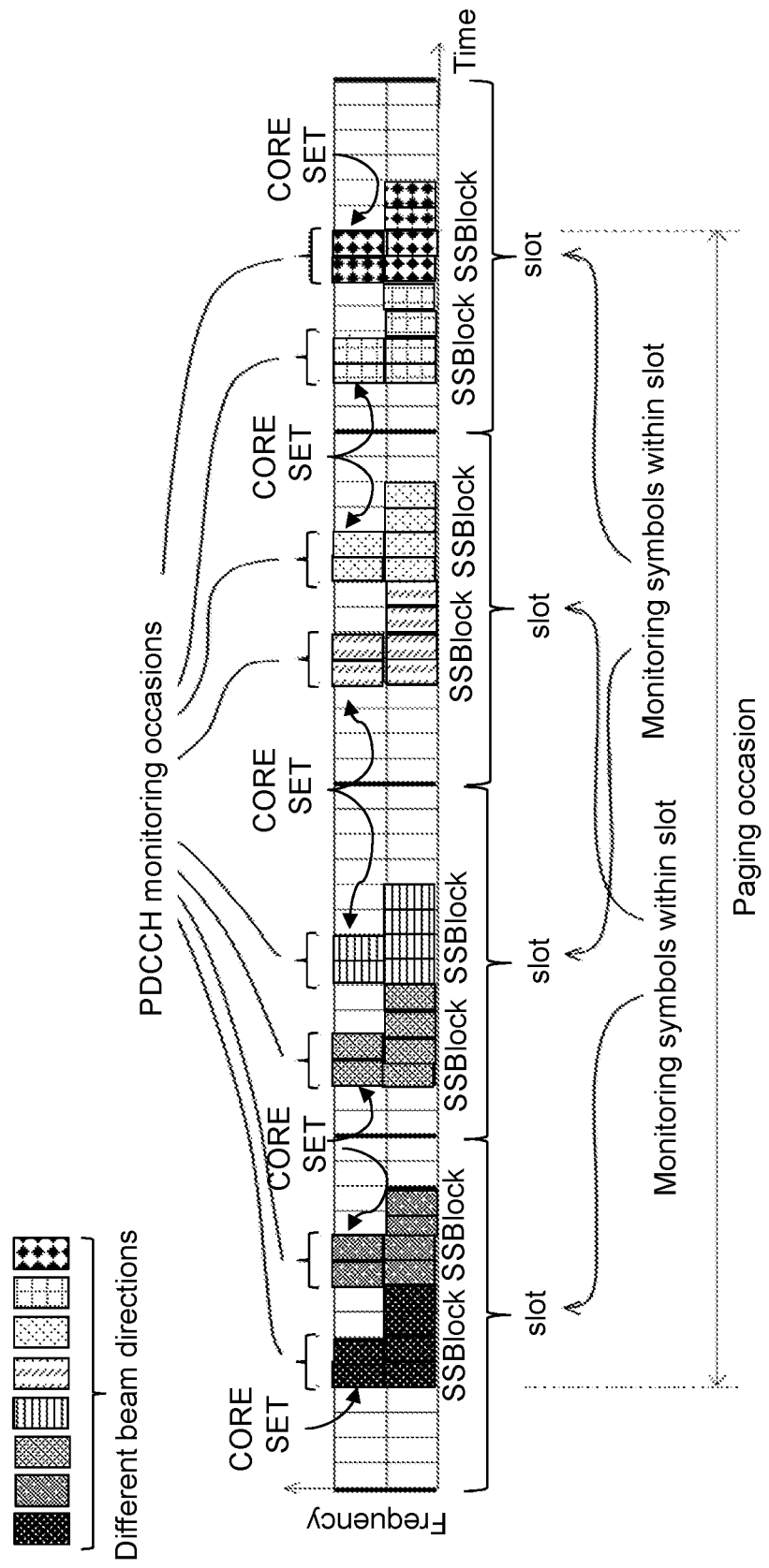
FIG. 3 illustrates an example where the proposed solution is applied to a PO coinciding with an SS Burst Set, according to certain embodiments.

FIG. 3 illustrates an example where the proposed solution is applied to a PO coinciding with an SS Burst Set, according to certain embodiments. The following parameter values are used in the example of FIG. 3:
  Carrier frequency f: 3 GHz<f<6 GHz
  SCS: 30 kHz (20 slots per radio frame)
  Number of beams: 8
  SSB transmission pattern: Pattern 1 for SCS=30 kHz (see FIG. 1)
  CORESET length: 2 OFDM symbols
  SS Burst Set periodicity: 40 ms
  Paging DRX cycle: 320 ms
  Number of PFs Per Paging
  DRX cycle (N): 16 (i.e. every second radio frame is a PF)
  Number of POs per PF (Ns): 1
  Monitoring slot offset: 0
  Monitoring slot periodicity: 2
  duration: 2
  monitoringSymbolsWithinSlot: 00001000100000 (where "1" indicates the first symbol of a PDCCH monitoring occasion)
  monitoringSymbolsWithinSlot2: 00100010000000 (where "1" indicates the first symbol of a PDCCH monitoring occasion)

According to certain embodiments, with the alternative use and interpretation of the monitoringSymbolsWithinSlot parameter, i.e. that it indicates all symbols of each PDCCH monitoring occasion, the bit string would be 00001100110000 (where "1" indicates a monitoring symbol). According to certain embodiments, with the alternative use and interpretation of the monitoringSymbolsWithinSlot2 parameter, i.e. that it indicates all symbols of each PDCCH monitoring occasion, the bit string would be 00110011000000 (where "1" indicates a monitoring symbol).

With a paging DRX cycle of 320 ms, 16 PFs per paging DRX cycle (with one PO per PF) and 40 ms SS Burst Set periodicity, then every second radio frame will be a PF and every second PF/PO will coincide with an SS Burst Set frame.

In the example of FIG. 3, the monitoring slot periodicity is equal to the duration parameter (both are set to 2 in the example, but the same result would be achieved by setting both to 4). This means that every slot is a monitoring slot.

Still, since UE knows from the SS Burst Set configuration information in the system information how many SSB beams there are (and thus how many beams that are used for transmission of paging), the UE only monitors the number of PDCCH monitoring occasions equal to the number of SSB beams for each PO.

Figure 4:
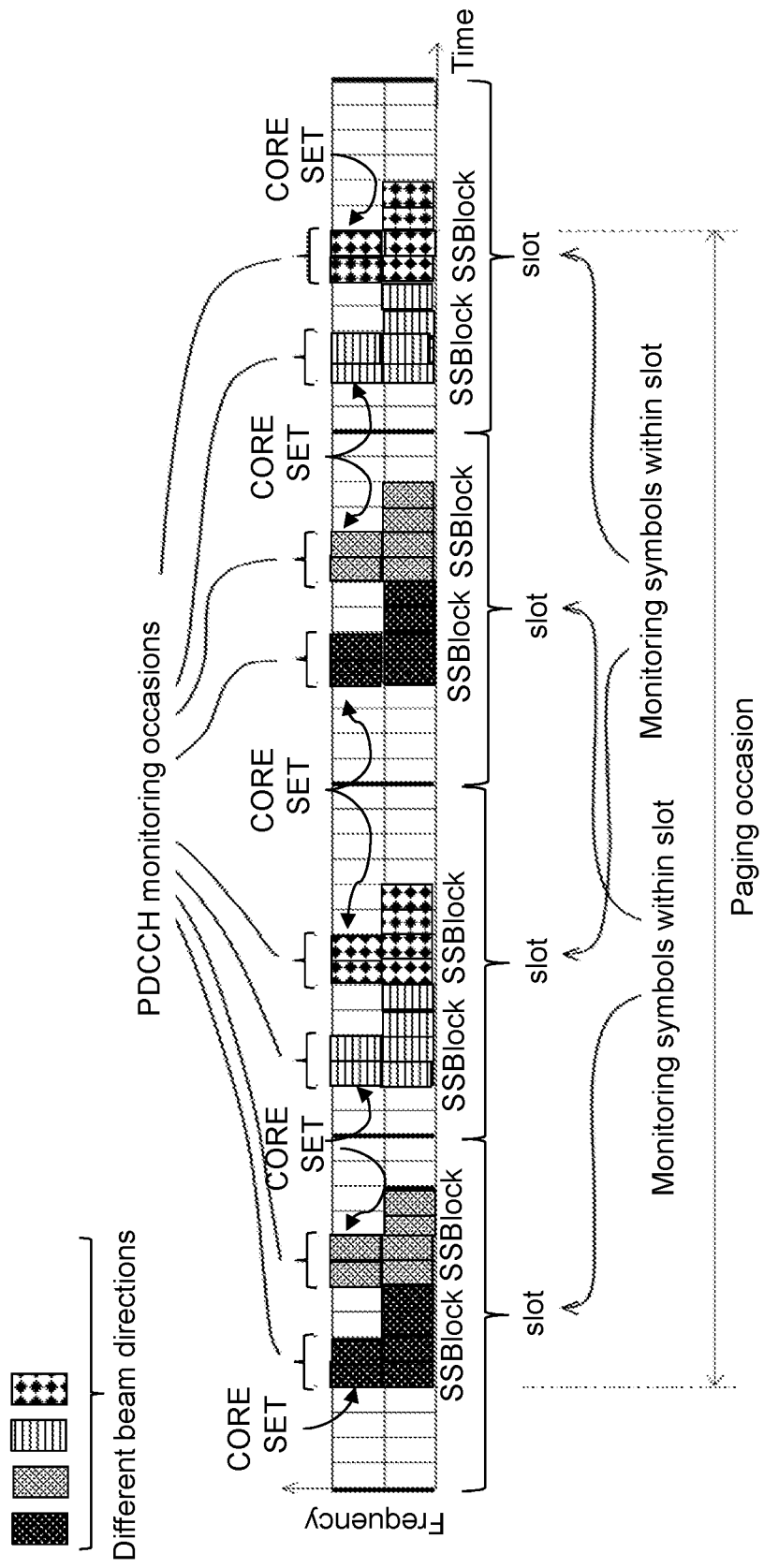
FIG. 4 illustrates another example where the proposed solution is applied to two paging occasions, according to certain embodiments.

FIG. 4 contains another similar example where the proposed solution is applied. A significant difference from the example of FIG. 3 is that there are two POs per PF and to create gaps between the POs in a PF, the monitoring slot periodicity is set to a greater value than the duration parameter. Another important difference is that the SS Burst Set periodicity is 5 ms, resulting in two SS Burst Sets in every PF. The following parameter values are used in the example of FIG. 4:
  Carrier frequency f: 3 GHz<f 6 GHz
  SCS: 30 kHz (20 slots per radio frame)
  Number of beams: 4
  SSB transmission pattern: Pattern 1 for SCS=30 kHz (see FIG. 1)
  CORESET length: 2 OFDM symbols
  SS Burst Set periodicity: 5 ms
  Paging DRX cycle: 320 ms
  Number of PFs Per Paging
  DRX cycle (N): 16 (i.e. every second radio frame is a PF)
  Number of POs per PF (Ns): 2
  Monitoring slot offset: 0
  Monitoring slot periodicity: 10
  duration: 2
  monitoringSymbolsWithinSlot: 00001000100000 (where "1" indicates the first symbol of a monitoring occasion)
  monitoringSymbolsWithinSlot2: 00100010000000 (where "1" indicates the first symbol of a monitoring occasion)

The examples of FIG. 3 and FIG. 4 show only the CORESET associated with the PDCCH. For the PDSCH transmission scheduled by the PDCCH there is more freedom. That can also be transmitted frequency-multiplexed with the SSBs, using the two remaining OFDM symbols per SSB in the examples, but it is also possible to transmit them time-multiplexed with the SSBs in the gaps between the SSBs or even after the complete SS Burst Set.

It may be noted that the monitoring pattern configured by the pagingSearchSpace parameters may only be applied within a paging frame. (It has been proposed that a PO could start within a PF and extend into a non-PF and if so, the monitoring pattern configured by the pagingSearchSpace parameters should extend beyond the PF for the duration of the PO.)

According to another embodiment, an additional option that may be considered is that the UE may consider the ssb-PositionsInBurst IE in the ServingCellConfigCommon IE in SIB1 and only monitor the PDCCH monitoring occasions that match an SSB indicated for transmission in the ssb-PositionsInBurst IE.

According to still another embodiment, yet another option may be that the pagingSearchSpace and/or CORESET may be different when the PO coincides with an SS Burst Set than when the PO does not (in a case of mix between POs coinciding with SS Burst Sets and POs not coinciding with SS Burst Sets). For instance, when only a subset of the POs coincide with SS Burst Sets the monitoringSymbolsWithinSlot2 parameter may only be used for the POs coinciding with SS Burst Sets.

According to certain other embodiments, yet another option may be to make that, if a PO overlaps partly with SS Burst Set, the PO is moved so that it coincides with the SS Burst Set and the alternative pagingSearchSpace (used for PO coinciding with SS Burst Set) is applied so that the PDCCH transmissions perfectly match the SSB transmissions. If this rule is applied, the ambiguity resolution in cases where there is a non-one-to-one relation between overlapping POs and SS Burst Sets could be the same.

Figure 5:
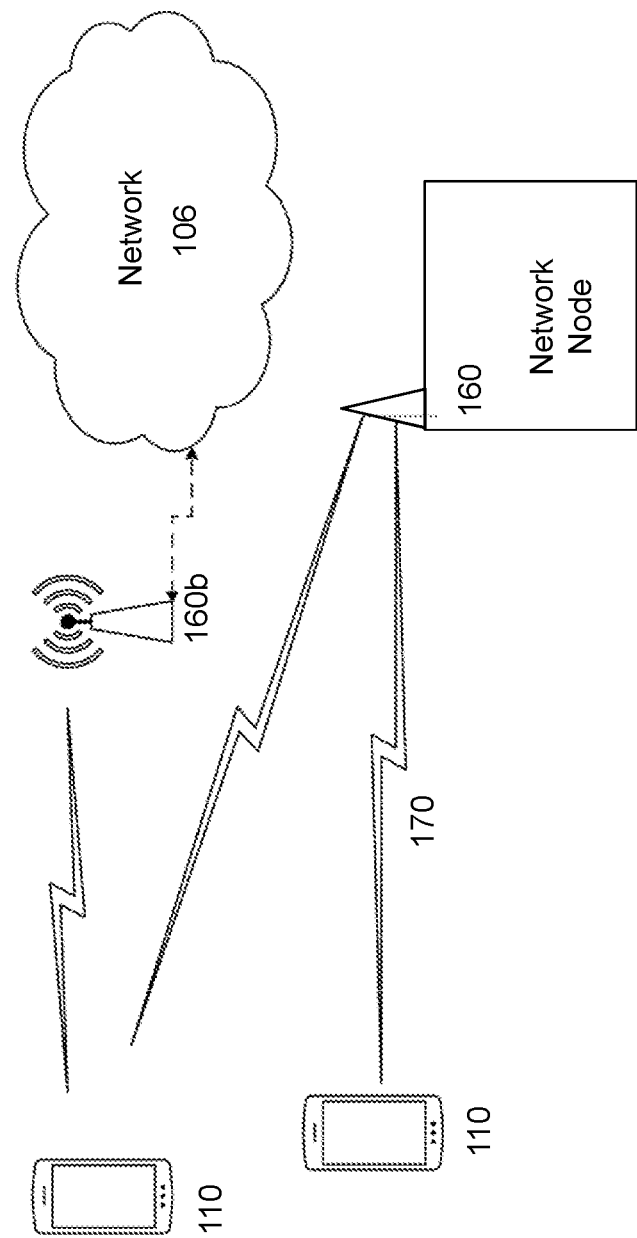
FIG. 5 illustrates an example wireless network for monitoring a physical downlink control channel (PDCCH) for paging messages, according to certain embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
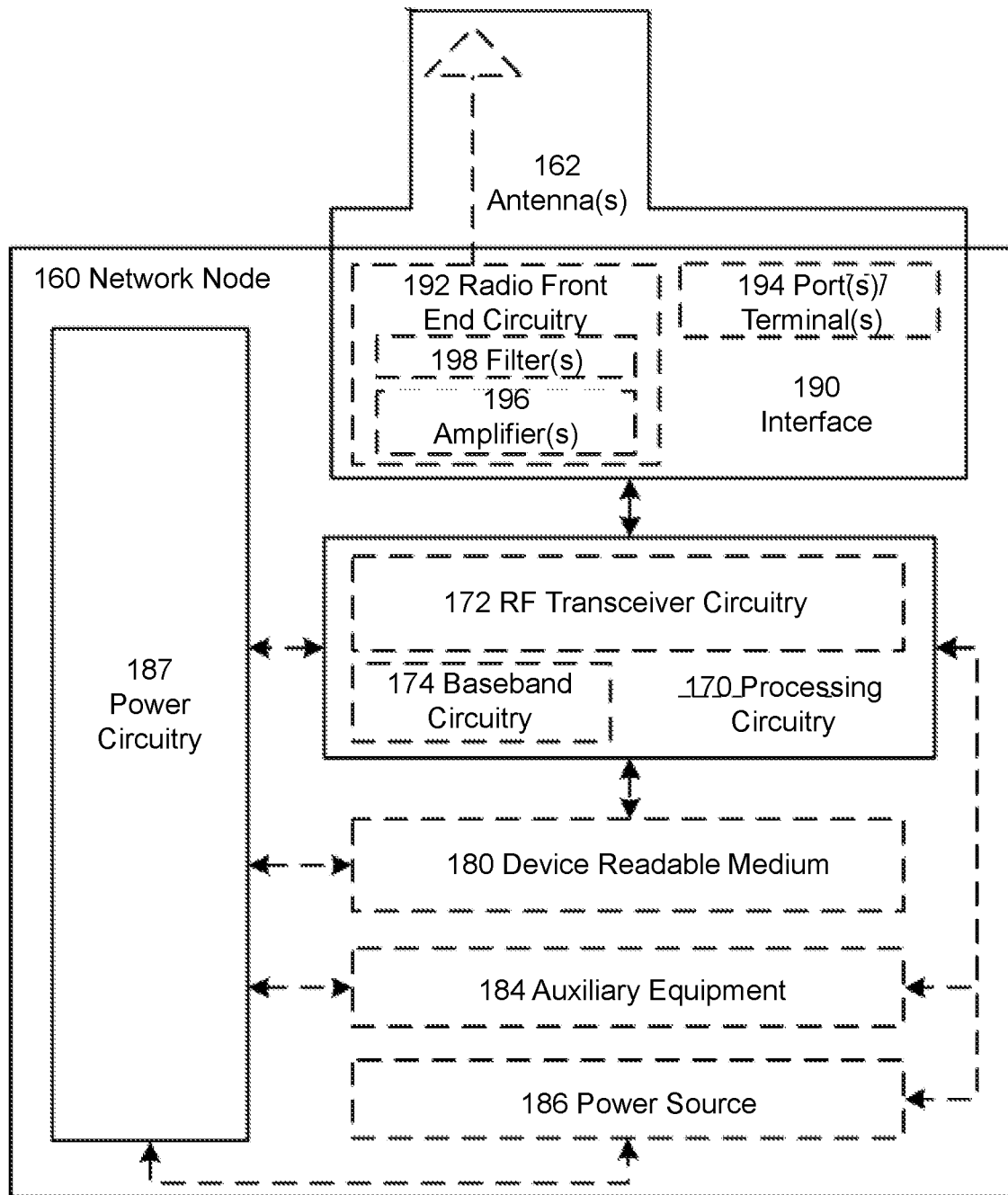
FIG. 6 illustrates an example network node for configuring a wireless device for monitoring a PDCCH for paging messages, according to certain embodiments.

FIG. 6 illustrates an example network node, in accordance with some embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
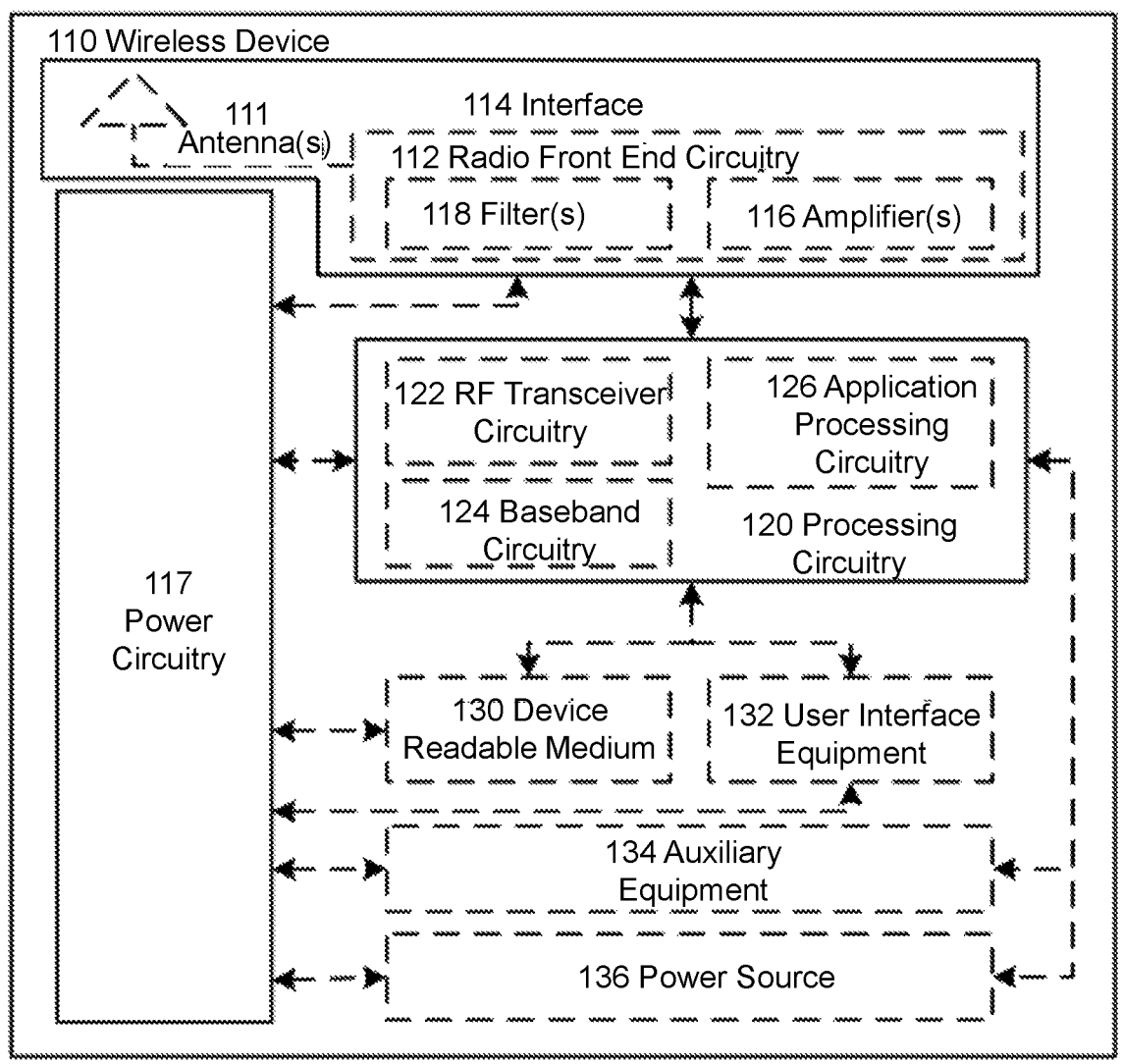
FIG. 7 illustrates an example wireless device for monitoring a PDCCH for paging messages, according to certain embodiments.

FIG. 7 illustrates an example wireless device (WD), in accordance with some embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 7, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated in FIG. 7, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
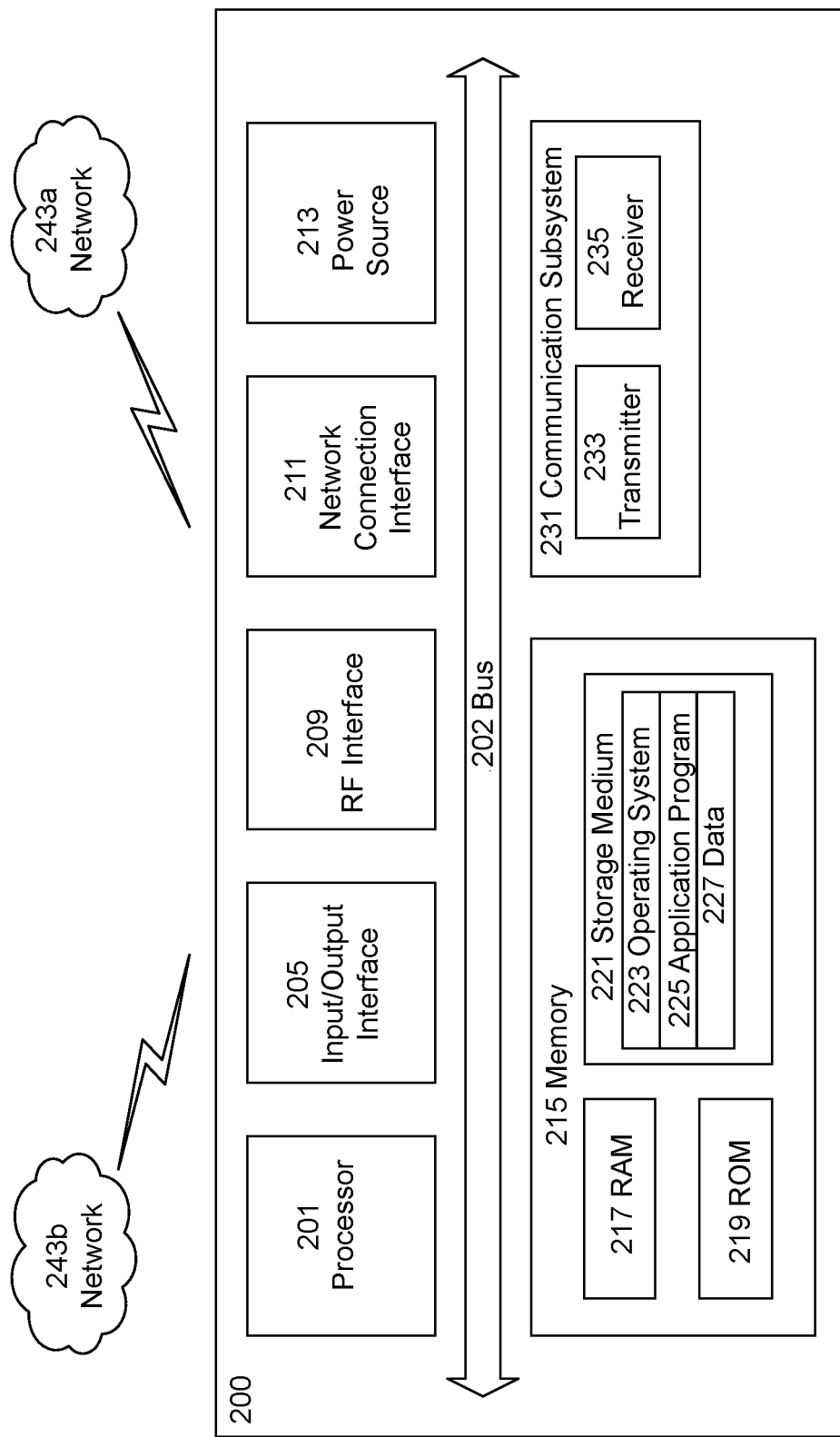
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
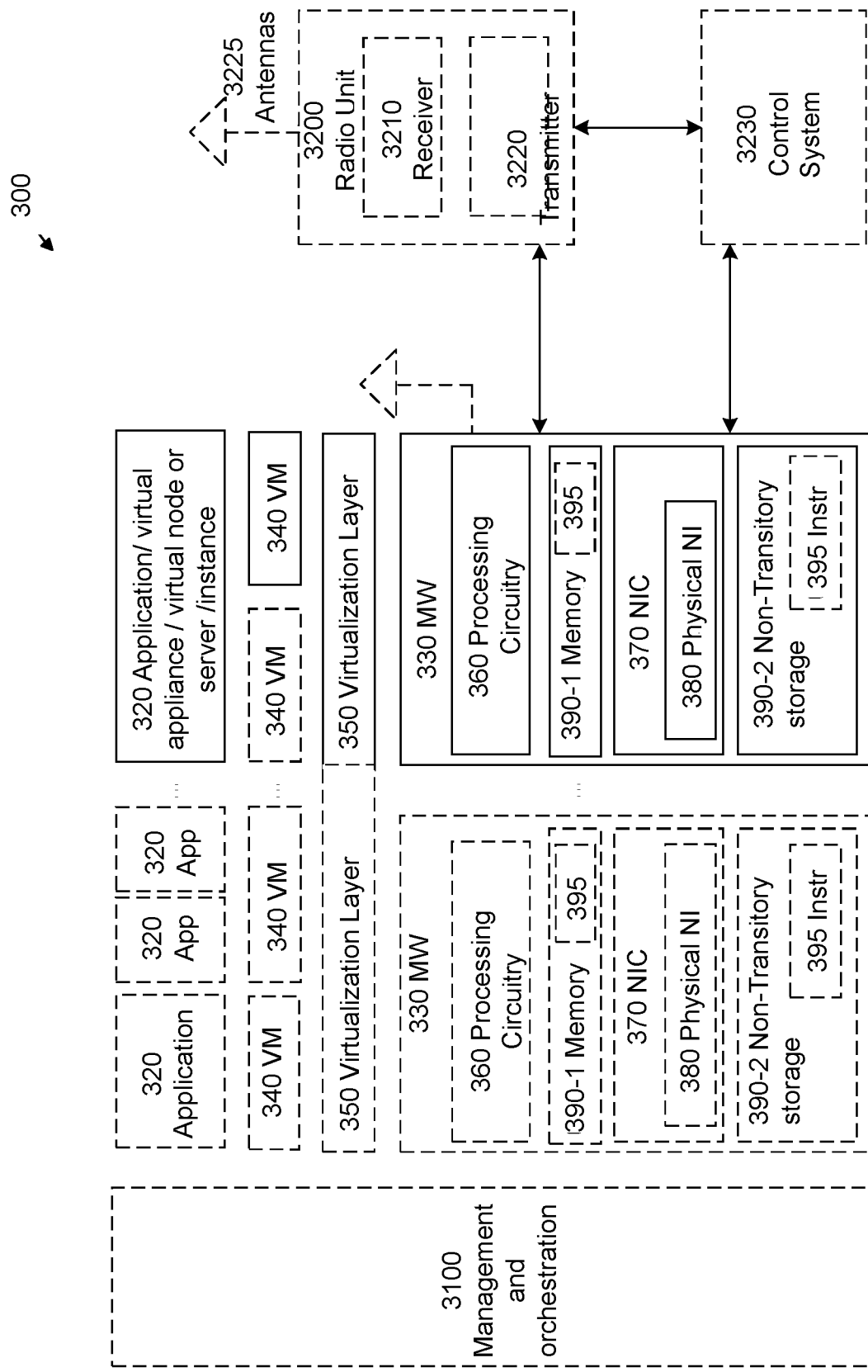
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 10:
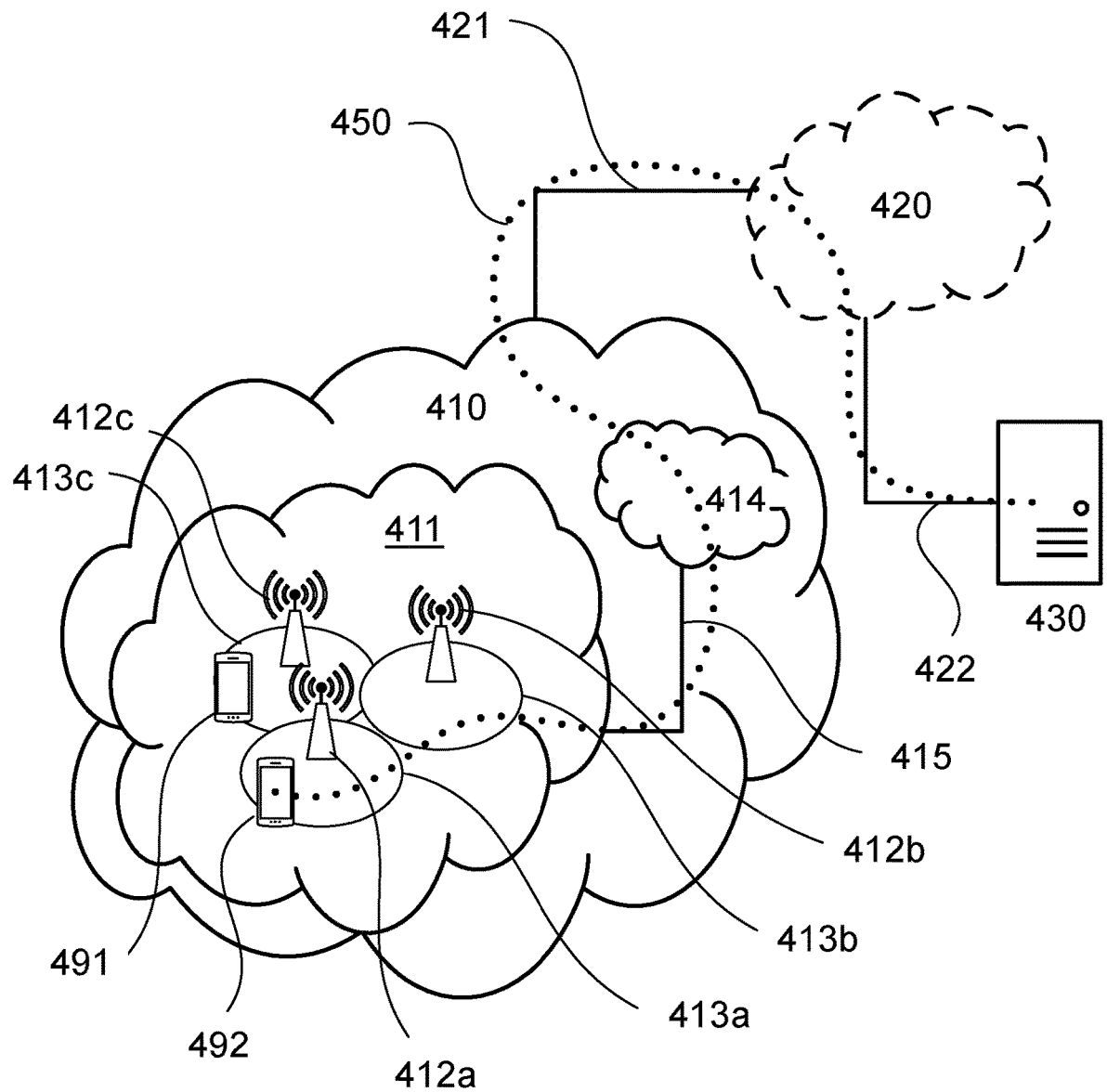
FIG. 10 illustrates a telecommunication network connected via an intermediate network to a host computer, according to certain embodiments.

FIG. 10 illustrates a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
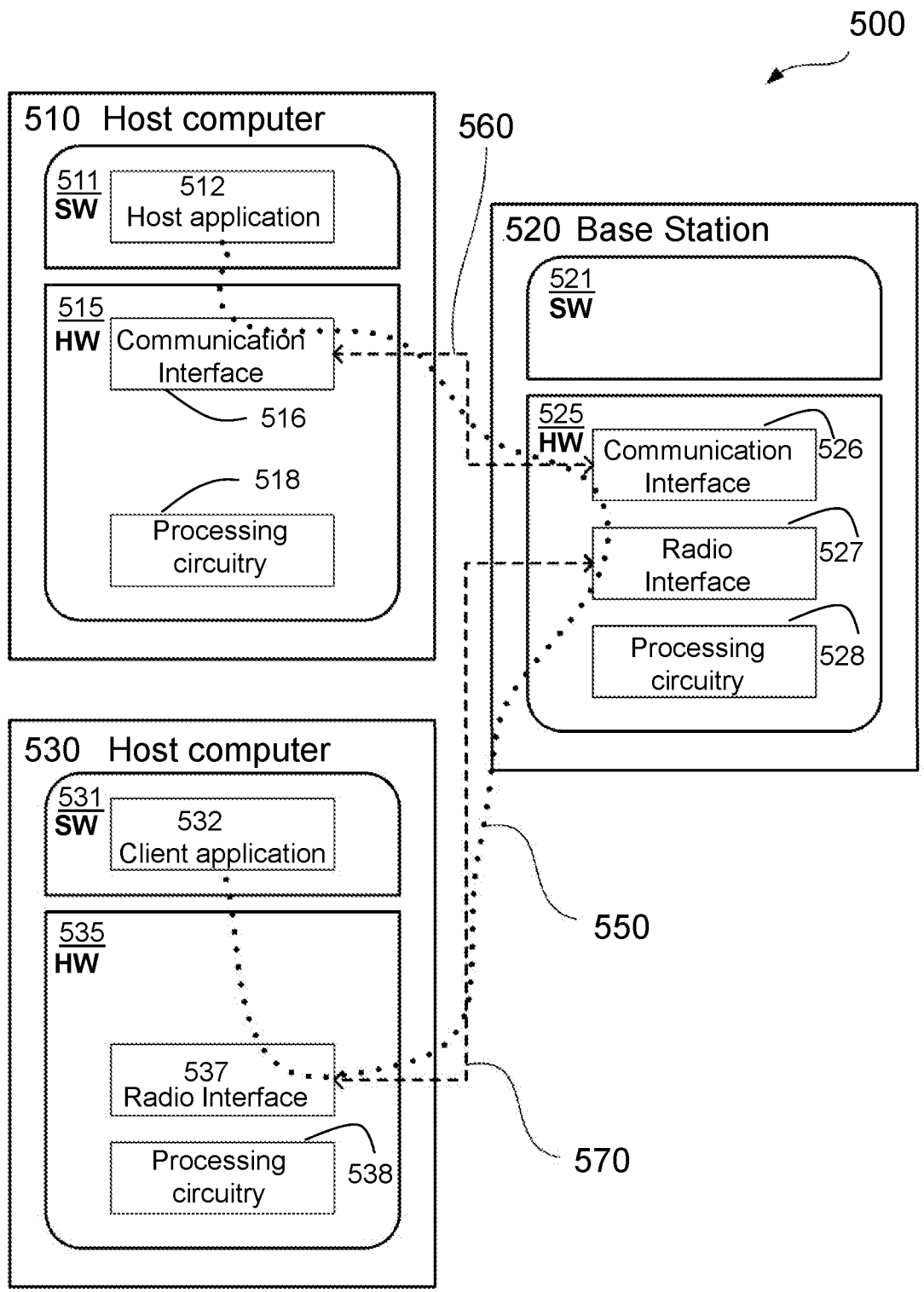
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
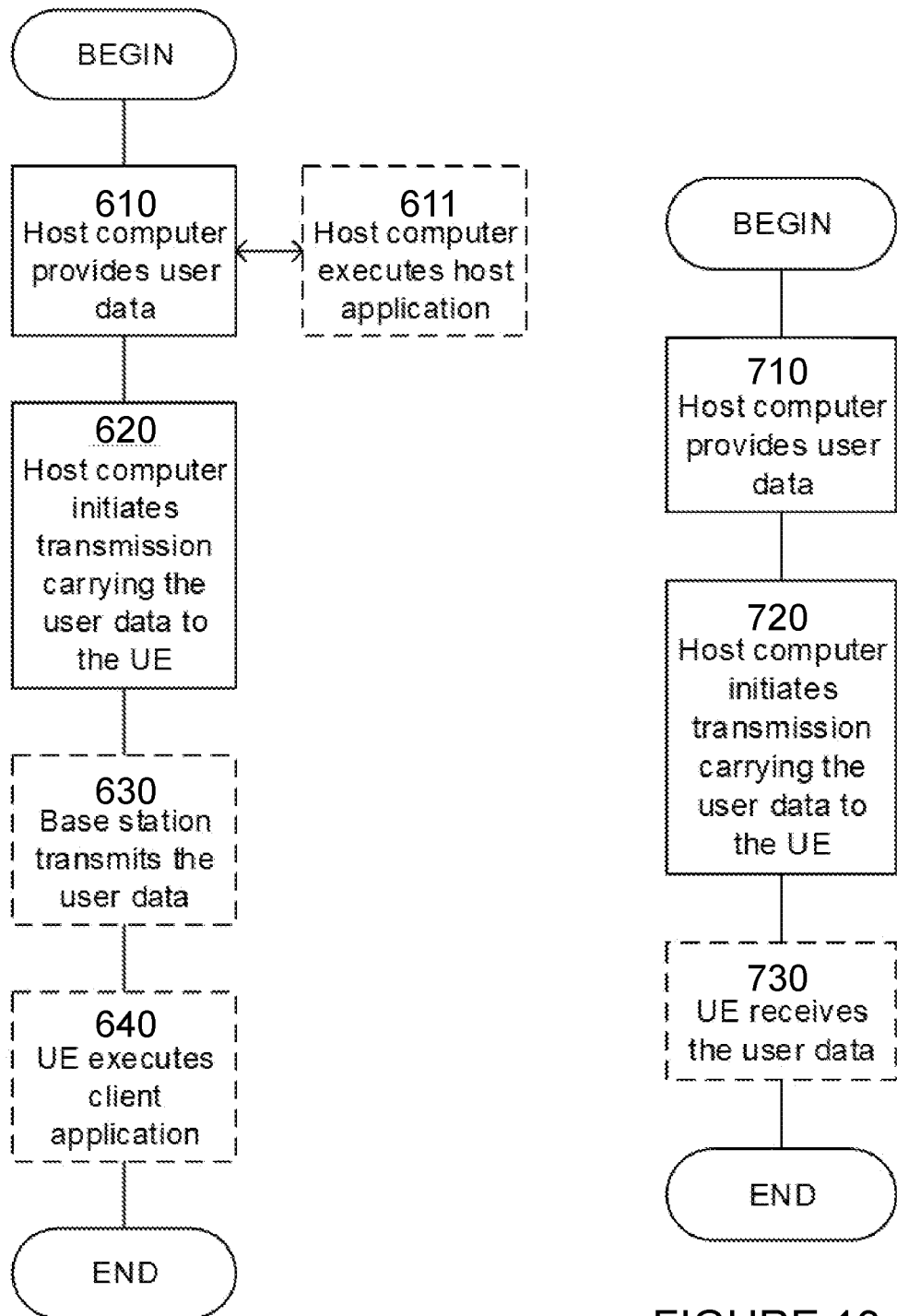
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 14, 15:
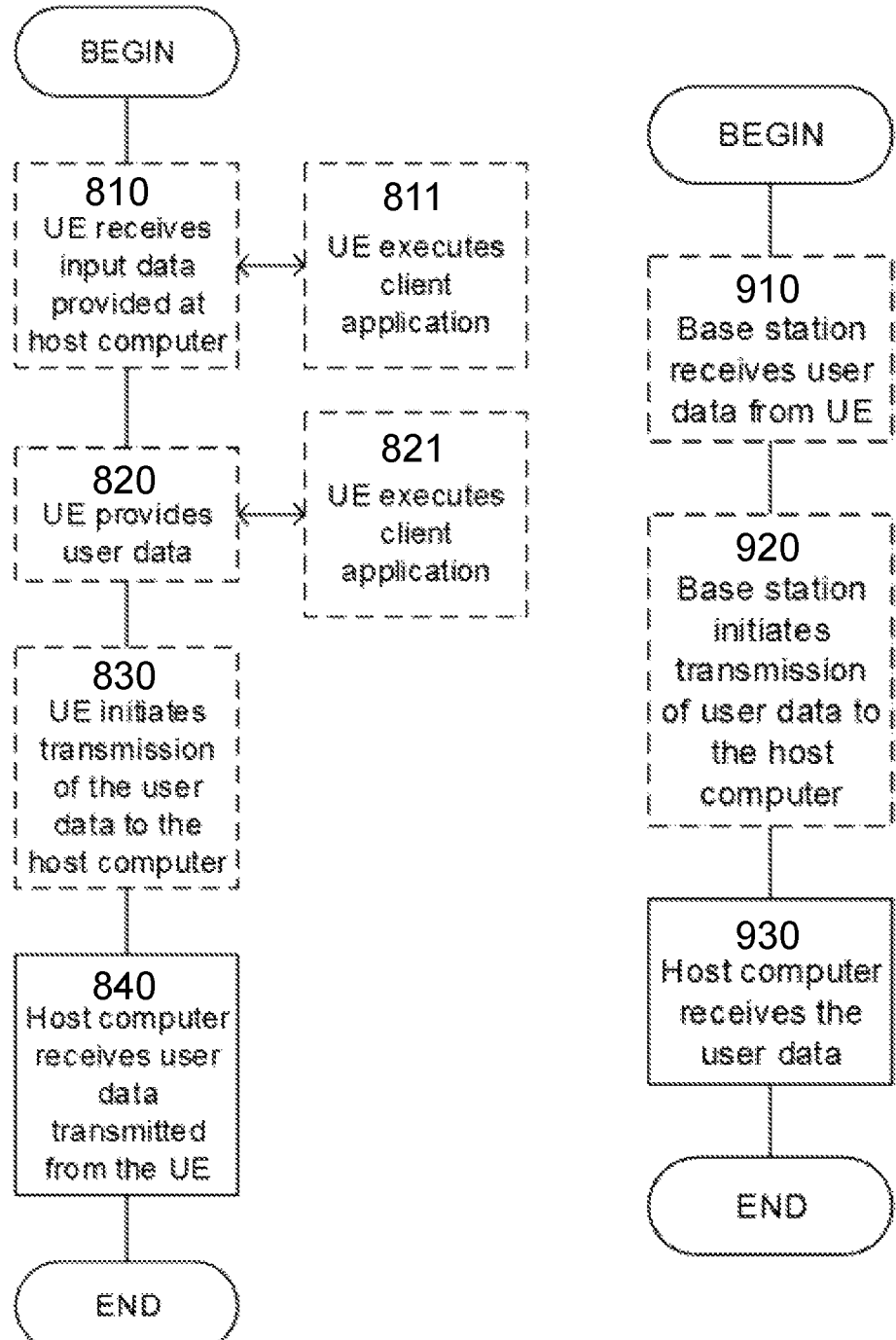
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 16:
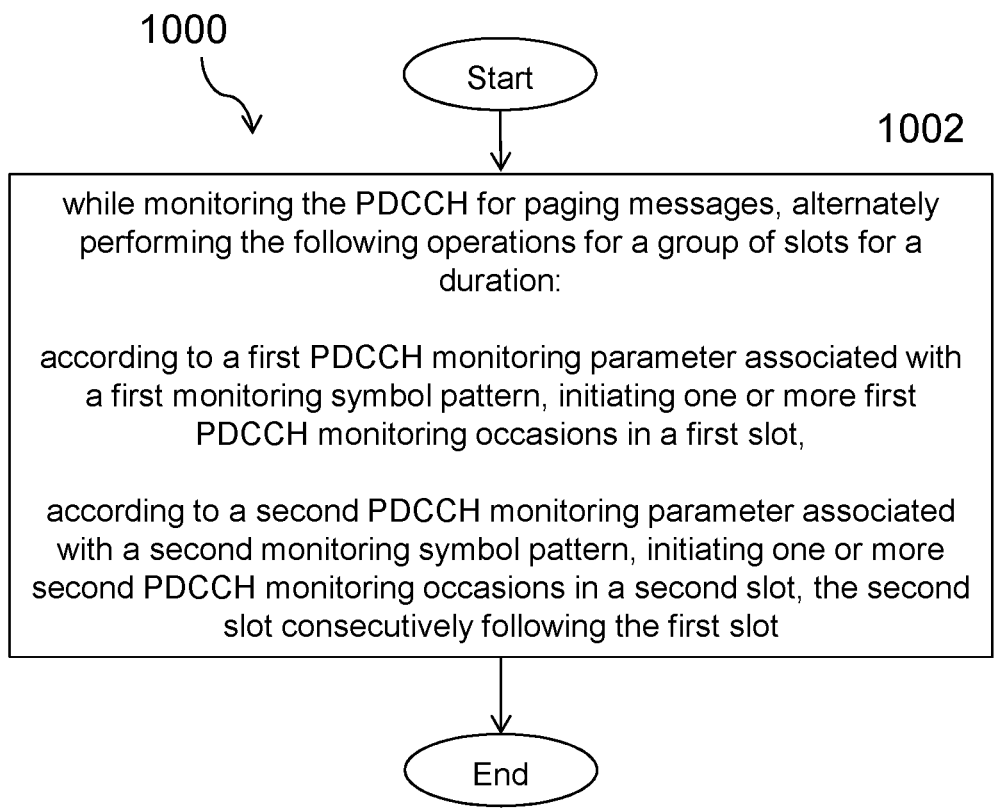
FIG. 16 illustrates an example method by a wireless device for monitoring a PDCCH for paging messages, according to certain embodiments.

FIG. 16 depicts a method 1000 by a wireless device 110 for monitoring a PDCCH for paging messages. At step 1002, while monitoring the PDCCH for paging messages, alternately performing the following operations for a group of slots for a duration, the wireless device 110 performs:

according to a first PDCCH monitoring parameter associated with a first monitoring symbol pattern, initiating one or more first PDCCH monitoring occasions in a first slot, according to a second PDCCH monitoring parameter associated with a second monitoring symbol pattern, initiating one or more second PDCCH monitoring occasions in a second slot, the second slot consecutively following the first slot, According to certain embodiments, the group of slots comprises at least the first slot and the second slot, and the first monitoring symbol pattern is different from the second monitoring symbol pattern.

Figure 17:
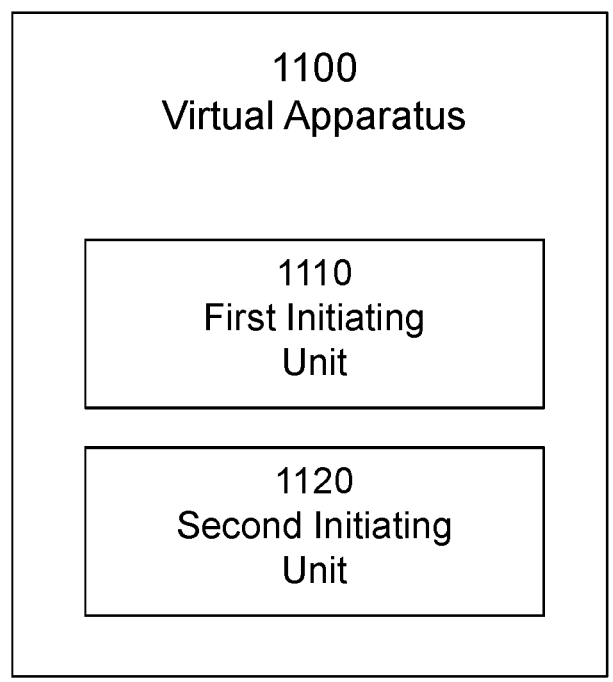
FIG. 17 illustrates an exemplary virtual computing device for monitoring a PDCCH for paging messages, according to certain embodiments.

FIG. 17 illustrates a schematic block diagram of a virtual apparatus 1100 in a wireless network (for example, the wireless network shown in FIG. 5). The apparatus may be implemented in a wireless device or network node (e.g., wireless device 110 or network node 160 shown in FIG. 5). Apparatus 1100 is operable to carry out the example method described with reference to FIG. 16 and possibly any other processes or methods disclosed herein. It is also to be understood that the method of FIG. 16 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first initiating module 1110, second initiating module 1120, and any other suitable units of apparatus 1100 to perform corresponding functions according one or more embodiments of the present disclosure.

According to certain embodiments, first initiating module 1110 may perform certain of the initiating functions of the apparatus 1100. For example, first initiating module 1110 may initiate one or more first PDCCH monitoring occasions in a first slot according to a first PDCCH monitoring parameter associated with a first monitoring symbol pattern while monitoring the PDCCH for paging messages for a group of slots for a duration.

According to certain embodiments, second initiating module 1120 may perform certain other of the initiating functions of the apparatus 1100. For example, second initiating module 1110 may initiate one or more second PDCCH monitoring occasions in a second slot according to a second PDCCH monitoring parameter associated with a second monitoring symbol pattern while monitoring the PDCCH for paging messages for the group of slots for the duration. According to certain embodiments, the group of slots comprises at least the first slot and the second slot, and the first monitoring symbol pattern is different from the second monitoring symbol pattern.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
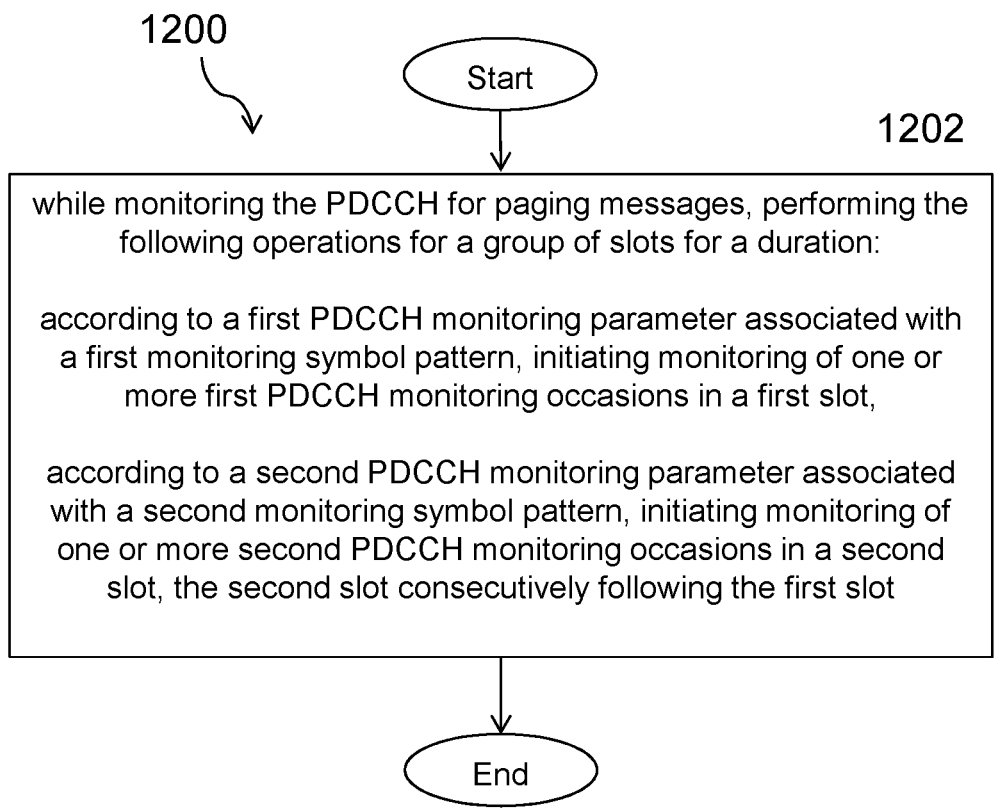
FIG. 18 illustrates another example method by a wireless device for monitoring a PDCCH for paging messages, according to certain embodiments.

FIG. 18 illustrates another method 1200 by a wireless device 110 for monitoring a PDCCH for paging messages. At step 1202, while monitoring the PDCCH for paging messages, the wireless device 110 initiates monitoring of one or more first PDCCH monitoring occasions in a first slot according to a first PDCCH monitoring parameter associated with a first monitoring symbol pattern. At step 1204, wireless device 110 initiates monitoring of one or more second PDCCH monitoring occasions in a second slot according to a second PDCCH monitoring parameter associated with a second monitoring symbol pattern. The group of slots includes at least the first slot and the second slot, and the second slot consecutively follows the first slot. The first monitoring symbol pattern is different from the second monitoring symbol pattern.

In a particular embodiment, the first PDCCH monitoring parameter contains a bit string representing the first monitoring symbol pattern and wherein the second PDCCH monitoring parameter contains a bit string representing the second monitoring symbol pattern.

In a particular embodiment, the group of slots includes at least a third slot following the second slot and a fourth slot following the third slot. The method further includes initiating monitoring of a third PDCCH monitoring occasion in the third slot according to the first PDCCH monitoring parameter associated with the first monitoring symbol pattern and initiating monitoring of a fourth PDCCH monitoring occasion in the fourth slot according to the second PDCCH monitoring parameter associated with the second monitoring symbol pattern.

In a further particular embodiment, the third slot consecutively follows the second slot and the fourth slot consecutively follows the third slot. In yet another embodiment, the group of slots comprises at least one additional slot between the second slot and the third slot.

In a particular embodiment, the method further includes receiving, from a network node, the first PDCCH monitoring parameter associated with the first monitoring symbol pattern and the second PDCCH monitoring parameter associated with the second monitoring symbol pattern.

In a particular embodiment, the first monitoring symbol pattern comprises a first bit string, and the second monitoring symbol pattern comprises a bit string. Each bit of the first bit string represents an OFDM symbol, and each bit set to one in the first bit string identifies a starting symbol of a respective PDCCH monitoring occasion to be monitored according to the first PDCCH monitoring parameter. Likewise, each bit of the second bit string represent an OFDM symbol, and each bit set to one in the second bit string identifies a starting symbol of a respective PDCCH monitoring occasion to be monitored according to the second PDCCH monitoring parameter.

In a particular embodiment, the one or more first PDCCH monitoring occasions may include a plurality of first PDCCH monitoring occasions, wherein monitoring of each of the first plurality of PDCCH monitoring occasions is initiated in the first slot according to the first monitoring symbol pattern. Additionally or alternatively, the one or more second PDCCH monitoring occasions may include a plurality of second PDCCH monitoring occasions, wherein monitoring of each of the plurality of second PDCCH monitoring occasions is initiated in the second slot according to the second monitoring symbol pattern.

In a particular embodiment, the steps of performing the operations for monitoring the PDCCH for paging messages according to the first PDCCH monitoring parameter associated with the first monitoring symbol pattern and the second PDCCH monitoring parameter associated with the second monitoring symbol pattern during the duration is performed in response to determining that a paging occasion configured by a network node 160 coincides with a SS Burst Set. The paging occasion identifies a regularly recurring time window during which the network node may transmit paging.

In a particular embodiment, the steps of performing the operations for monitoring the PDCCH for paging messages according to the first PDCCH monitoring parameter associated with the first monitoring symbol pattern and the second PDCCH monitoring parameter associated with the second monitoring symbol pattern during the duration is performed in response to determining that a paging occasion configured by a network node partially overlaps with a SS Burst Set. The paging occasion identifies a regularly recurring time window during which the network node may transmit paging.

In a further particular embodiment, upon determining that the paging occasion configured by the network node partially overlaps with the SS Burst Set, wireless device 110 may move the paging occasion to make the paging occasion coincide with the SS Burst Set before initiating the monitoring the one or more first PDCCH monitoring occasions in the first slot and the one or more second PDCCH monitoring occasions in the second slot.

Figure 19:
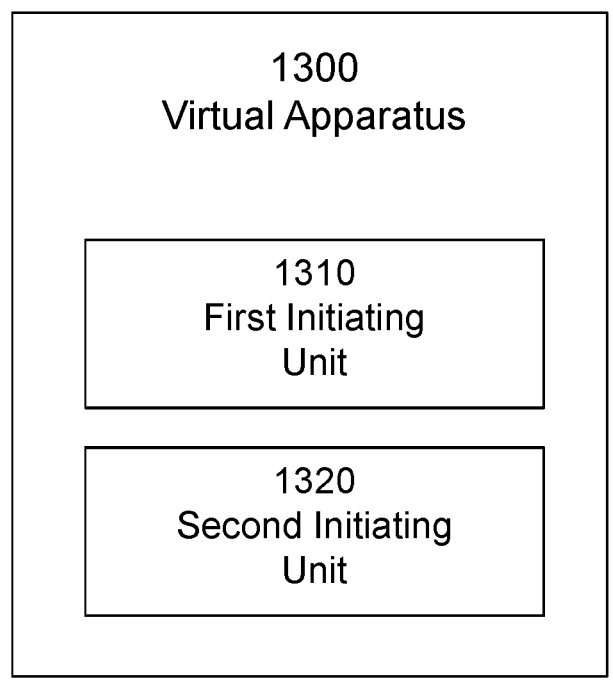
FIG. 19 illustrates another exemplary virtual computing device for monitoring a PDCCH for paging messages, according to certain embodiments.

FIG. 19 illustrates a schematic block diagram of a virtual apparatus 1300 in a wireless network (for example, the wireless network shown in FIG. 5). The apparatus may be implemented in a wireless device or network node (e.g., wireless device 110 or network node 160 shown in FIG. 5). Apparatus 1300 is operable to carry out the example method described with reference to FIG. 18 and possibly any other processes or methods disclosed herein. It is also to be understood that the method of FIG. 18 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first initiating module 1310, second initiating module 1320, and any other suitable units of apparatus 1300 to perform corresponding functions according one or more embodiments of the present disclosure.

According to certain embodiments, first initiating module 1310 may perform certain of the initiating functions of the apparatus 1100. For example, while monitoring the PDCCH for paging messages, first initiating module 1310 may initiate monitoring of one or more first PDCCH monitoring occasions in a first slot according to a first PDCCH monitoring parameter associated with a first monitoring symbol pattern.

According to certain embodiments, second initiating module 1320 may perform certain other of the initiating functions of the apparatus 1300. For example, second initiating module 1310 may initiate monitoring of one or more second PDCCH monitoring occasions in a second slot according to a second PDCCH monitoring parameter associated with a second monitoring symbol pattern. According to certain embodiments, the second slot consecutively follows the first slot, and the first monitoring symbol pattern is different from the second monitoring symbol pattern.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
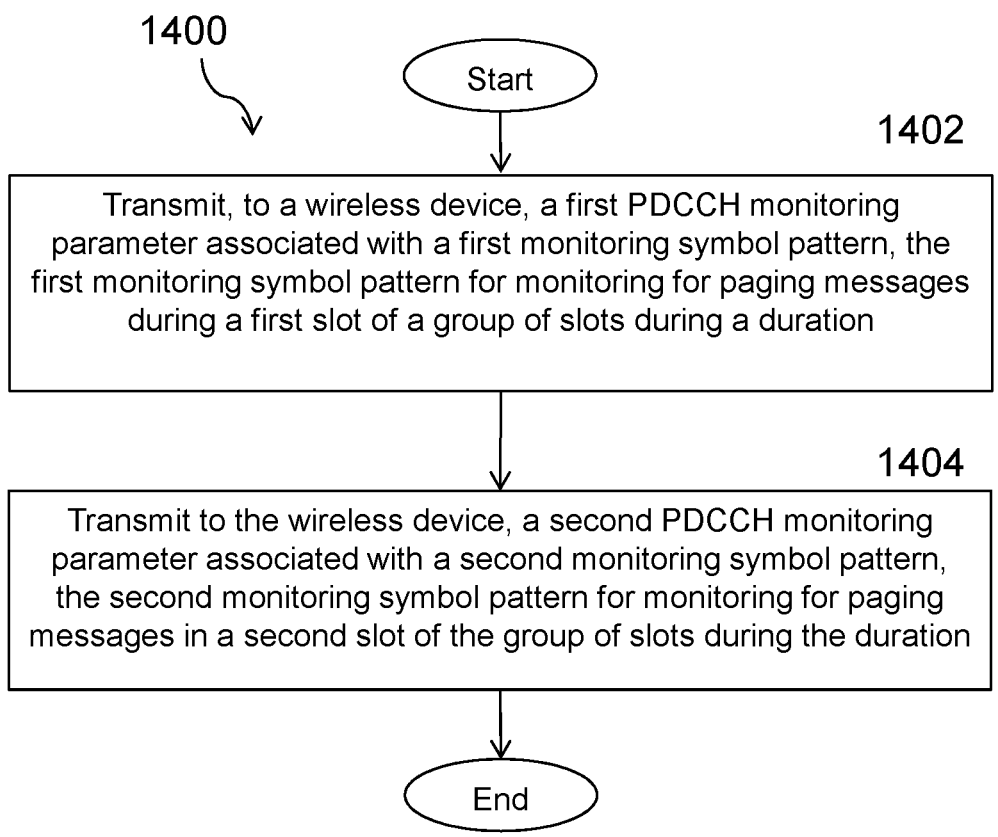
FIG. 20 illustrates an example method by a network node for configuring a wireless device for monitoring a PDCCH for paging messages, according to certain embodiments.

FIG. 20 depicts a method 1400 by a network node 160 for configuring a wireless device 110 to monitor a PDCCH for paging messages, according to certain embodiments. At step 1402, the network node 160 transmits, to wireless device 110, a first PDCCH monitoring parameter associated with a first monitoring symbol pattern, the first monitoring symbol pattern for monitoring for paging messages during a first slot of a group of slots during a duration.

At step 1604, the network node transmits, to the wireless device, a second PDCCH monitoring parameter associated with a second monitoring symbol pattern, the second monitoring symbol pattern for monitoring for paging messages in a second slot of the group of slots during the duration. According to certain embodiments, the first monitoring symbol pattern is different from the second monitoring symbol pattern.

Figure 21:
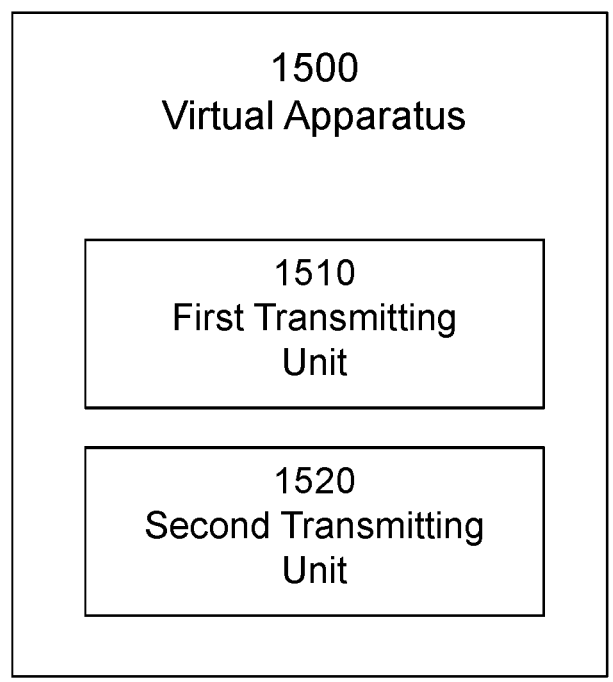
FIG. 21 illustrates another exemplary virtual computing device for configuring a wireless device for monitoring a PDCCH for paging messages, according to certain embodiments.

FIG. 21 illustrates a schematic block diagram of a virtual apparatus 1500 in a wireless network (for example, the wireless network shown in FIG. 5). The apparatus may be implemented in a wireless device or network node (e.g., wireless device 110 or network node 160 shown in FIG. 5). Apparatus 1500 is operable to carry out the example method described with reference to FIG. 20 and possibly any other processes or methods disclosed herein. It is also to be understood that the method of FIG. 20 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1510, second transmitting module 1520, and any other suitable units of apparatus 1500 to perform corresponding functions according one or more embodiments of the present disclosure.

According to certain embodiments, first transmitting module 1510 may perform certain of the transmitting functions of the apparatus 1500. For example, first transmitting module 1510 may transmit, to a wireless device, a first PDCCH monitoring parameter associated with a first monitoring symbol pattern, where the first monitoring symbol pattern is for monitoring for paging messages during a first slot of a group of slots during a duration.

According to certain embodiments, second transmitting module 1520 may perform certain other of the transmitting functions of the apparatus 1500. For example, second transmitting module 1520 may transmit, to a wireless device, a second PDCCH monitoring parameter associated with a second monitoring symbol pattern, the second monitoring symbol pattern for monitoring for paging messages during a second slot of a group of slots during a duration, and wherein the first monitoring symbol pattern is different from the second monitoring symbol pattern.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
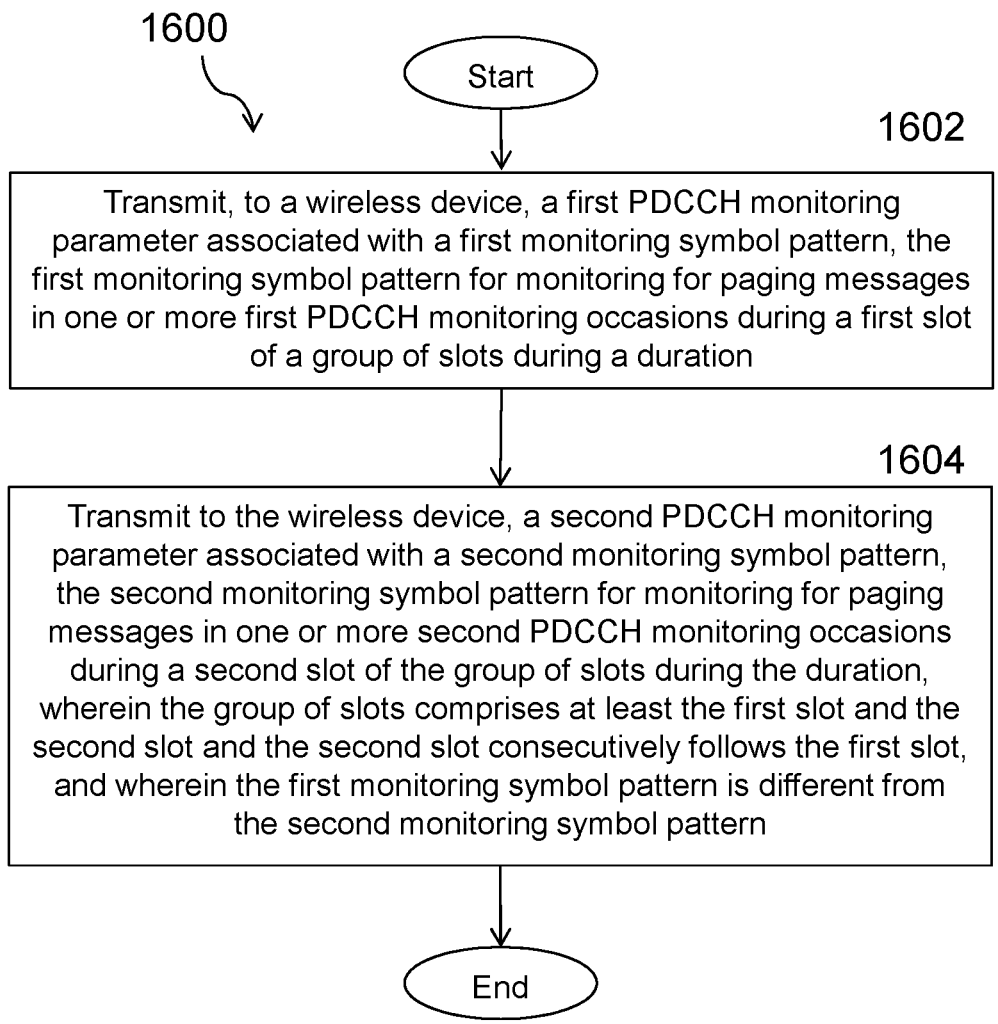
FIG. 22 illustrates another example method by a network node for configuring a wireless device for monitoring a PDCCH for paging messages, according to certain embodiments.

FIG. 22 depicts another example method 1600 by a network node 160 for configuring a wireless device 110 to monitor a PDCCH for paging messages in a group of slots for a duration, according to certain embodiments. The group of slots includes at least a first slot and a second slot that consecutively follows the first slot. At step 1602, network node 160 transmits, to wireless device 110, a first PDCCH monitoring parameter associated with a first monitoring symbol pattern for monitoring for paging messages in one or more first PDCCH monitoring occasions during a first slot of a group of slots during a duration. At step 1605, network node 160 transmits, to wireless device 110, a second PDCCH monitoring parameter associated with a second monitoring symbol pattern for monitoring for paging messages in one or more second PDCCH monitoring occasions during a second slot of the group of slots during the duration. The first monitoring symbol pattern is different from the second monitoring symbol pattern.

In a particular embodiment, the first PDCCH monitoring parameter contains a bit string representing the first monitoring symbol pattern and wherein the second PDCCH monitoring parameter contains a bit string representing the second monitoring symbol pattern.

In a particular embodiment, the group of slots includes at least a third slot following the second slot and a fourth slot following the third slot. The first monitoring symbol pattern is also for monitoring for paging messages during the third slot of the group of slots during the duration, and the second monitoring symbol pattern is also for monitoring for paging messages during the fourth slot of the group of slots during the duration.

In a further particular embodiment, the third slot consecutively follows the second slot and the fourth slot consecutively follows the third slot. In another particular embodiment, the group of slots includes at least one additional slot between the second slot and the third slot.

In a particular embodiment, network node 160 receives, from another network node, the first PDCCH monitoring parameter associated with the first monitoring symbol pattern and the second PDCCH monitoring parameter associated with the second monitoring symbol pattern.

In a particular embodiment, the first monitoring symbol pattern comprises a first bit string, and the second monitoring symbol pattern comprises a bit string. Each bit of the first bit string represents an OFDM symbol, and each bit set to one in the first bit string identifies a starting symbol of a respective PDCCH monitoring occasion to be monitored according to the first PDCCH monitoring parameter. Likewise, each bit of the second bit string represent an OFDM symbol, and each bit set to one in the second bit string identifies a starting symbol of a respective PDCCH monitoring occasion to be monitored according to the second PDCCH monitoring parameter.

In a particular embodiment, the one or more first PDCCH monitoring occasions may include a plurality of first PDCCH monitoring occasions for which monitoring is initiated in the first slot according to the first monitoring symbol pattern. Additionally or alternatively, the one or more second PDCCH monitoring occasions may include a plurality of second PDCCH monitoring occasions for which monitoring is initiated in the second slot according to the second monitoring symbol pattern.

In a particular embodiment, network node 160 transmits, to wireless device 110, an indication that wireless device 110 is to use the first PDCCH monitoring parameter associated with the first monitoring symbol pattern and the second PDCCH monitoring parameter associated with the second monitoring symbol pattern during the duration.

In a particular embodiment, the indication to use the first PDCCH monitoring parameter associated with the first monitoring symbol pattern and the second PDCCH monitoring parameter associated with the second monitoring symbol pattern during the duration is transmitted in response to network node 160 determining that a paging occasion configured by network node 160 coincides with a SS Burst Set. The paging occasion identifies a regularly recurring time window during which the network node 160 may transmit paging.

In another particular embodiment, the indication to use the first PDCCH monitoring parameter associated with the first monitoring symbol pattern and the second PDCCH monitoring parameter associated with the second monitoring symbol pattern during the duration may be transmitted in response to network node 160 determining that a paging occasion configured by network node 160 partially overlaps with a SS Burst Set, and the paging occasion may identify a regularly recurring time window during which network node 160 may transmit paging.

In a particular embodiment, network node 160 may configure wireless device 110 to move the paging occasion to make the paging occasion coincide with the SS Burst Set before initiating the monitoring the one or more first PDCCH monitoring occasions in the first slot and the one or more second PDCCH monitoring occasions in the second slot when the paging occasion configured by network node 160 partially overlaps with the SS Burst Set.

In a particular embodiment, the indication to use the first PDCCH monitoring parameter associated with the first monitoring symbol pattern and the second PDCCH monitoring parameter associated with the second monitoring symbol pattern during the duration may be transmitted in response to network node 160 determining that a SSB transmission pattern used for the SS Burst Set includes different OFDM symbols for the first slot and the second slot consecutively following the first slot.

Figure 23:
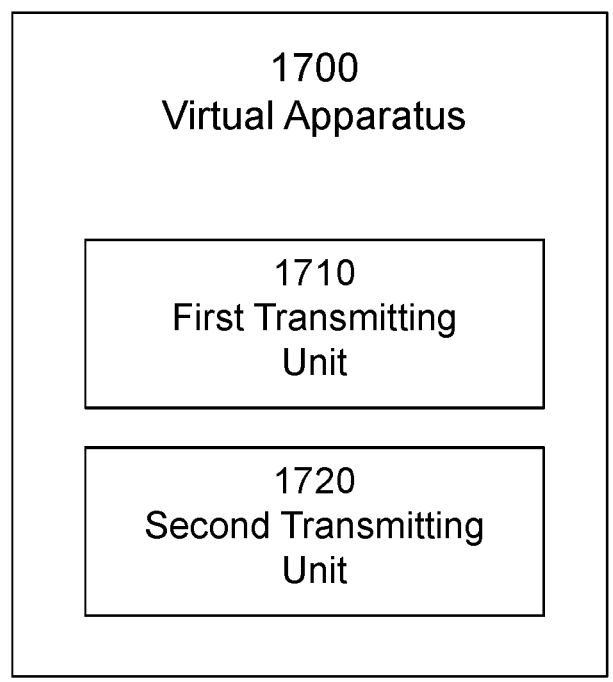
FIG. 23 illustrates another exemplary virtual computing device for configuring a wireless device for monitoring a PDCCH for paging messages, according to certain embodiments.

FIG. 23 illustrates a schematic block diagram of another virtual apparatus 1700 in a wireless network (for example, the wireless network shown in FIG. 5). The apparatus may be implemented in a wireless device or network node (e.g., wireless device 110 or network node 160 shown in FIG. 5). Apparatus 1700 is operable to carry out the example method described with reference to FIG. 22 and possibly any other processes or methods disclosed herein. It is also to be understood that the method of FIG. 22 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first transmitting module 1710, second transmitting module 1720, and any other suitable units of apparatus 1700 to perform corresponding functions according one or more embodiments of the present disclosure.

According to certain embodiments, first transmitting module 1710 may perform certain of the transmitting functions of the apparatus 1700. For example, first transmitting module 1710 may transmit, to a wireless device 110, a first PDCCH monitoring parameter associated with a first monitoring symbol pattern for monitoring for paging messages in one or more first PDCCH monitoring occasions during a first slot of a group of slots during a duration.

According to certain embodiments, second transmitting module 1720 may perform certain other of the transmitting functions of the apparatus 1700. For example, second transmitting module 1720 may transmit, to a wireless device 110, a second PDCCH monitoring parameter associated with a second monitoring symbol pattern for monitoring for paging messages in one or more second PDCCH monitoring occasions during a second slot of the group of slots during the duration.

According to certain embodiments, the group of slots includes at least a first slot and a second slot that consecutively follows the first slot, and the first monitoring symbol pattern is different from the second monitoring symbol pattern.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Embodiment 1. A method by a wireless device for monitoring a physical downlink control channel (PDCCH) for paging messages, the method comprising:
while monitoring the PDCCH for paging messages, alternately performing the following operations for a group of slots for a duration:
according to a first PDCCH monitoring parameter associated with a first monitoring symbol pattern, initiating one or more first PDCCH monitoring occasions in a first slot,
according to a second PDCCH monitoring parameter associated with a second monitoring symbol pattern, initiating one or more second PDCCH monitoring occasions in a second slot, the second slot consecutively following the first slot,
wherein the group of slots comprises at least the first slot and the second slot, and
wherein the first monitoring symbol pattern is different from the second monitoring symbol pattern.
Embodiment 2. The method of embodiment 1, wherein:
the group of slots comprises at least a third slot consecutively following the second slot and a fourth slot consecutively following the third slot, and
the method comprises:
initiating one or more third PDCCH monitoring occasions in the third slot according to the first PDCCH monitoring parameter associated with the first monitoring symbol pattern; and
initiating one or more fourth PDCCH monitoring occasions in the fourth slot according to the second PDCCH monitoring parameter associated with the second monitoring symbol pattern.
Embodiment 3. The method any one of embodiments 1 to 2, further comprising receiving from a network node:
the first PDCCH monitoring parameter associated with the first monitoring symbol pattern; and
the second PDCCH monitoring parameter associated with the second monitoring symbol pattern.
Embodiment 4. The method of any one of embodiments 1 to 3, wherein:
the first monitoring symbol pattern comprises a first pattern of OFDM symbols, each symbol in the first pattern of OFDM symbols identifying a starting symbol of a respective PDCCH monitoring occasion to be performed according to the first PDCCH monitoring parameter; and
the second monitoring symbol pattern comprises a second pattern of OFDM symbols, each symbol in the second pattern of OFDM symbol identifying a starting symbol of a respective PDCCH monitoring occasion to be performed according to the second PDCCH monitoring parameter.

Embodiment 5. The method of any one of embodiments 1 to 4, wherein at least one of:
the one or more first PDCCH monitoring occasions comprise a plurality of first PDCCH monitoring occasions that are each initiated with the first slot according to the first monitoring symbol pattern; and
the one or more second PDCCH monitoring occasions comprise a plurality of second PDCCH monitoring occasions that are each initiated with the second slot according to the second monitoring symbol pattern.
Embodiment 6. The method of any of embodiments 1 to 5, wherein the steps of alternately performing the operations for monitoring the PDCCH for paging messages according to the first PDCCH monitoring parameter associated with the first monitoring symbol pattern and the second PDCCH monitoring parameter associated with the first monitoring symbol pattern during the duration is performed in response to:
performing a first determination that a paging occasion of a network node coincides with an synchronization signal (SS) Burst Set, the paging occasion identifying a regularly recurring time window during which the network node transmits paging; and
performing a second determination that a synchronization signal block (SSB) transmission pattern used for the SS Burst Set includes different OFDM symbols for the first slot and the second slot consecutively following the first slot.
Embodiment 7. A computer program comprising instructions which when executed on a computer perform any of the methods of embodiments 1 to 6.
Embodiment 8. A computer program product comprising computer program, the computer program comprising instructions which when executed on a computer perform any of the methods of embodiments 1 to 6.
Embodiment 9. A non-transitory computer readable medium storing instructions which when executed by a computer perform any of the methods of embodiments 1 to 6.
Embodiment 10. A wireless device comprising:
memory operable to store instructions; and
processing circuitry operable to execute the instructions to cause the wireless device to perform any of embodiments 1 to 6.
Embodiment 11. A method implemented in a communication system including a host computer, a base station and a user equipment (UE), the method comprising:
at the host computer, providing user data; and
at the host computer, initiating a transmission carrying the user data to the UE via a cellular network comprising the base station,
wherein, while monitoring the PDCCH for paging messages, alternately performing the following operations for a group of slots for a duration, the UE:
initiates one or more first PDCCH monitoring occasions in a first slot according to a first PDCCH monitoring parameter associated with a first monitoring symbol pattern;
initiates one or more second PDCCH monitoring occasions in a second slot, the second slot consecutively following the first slot according to a second PDCCH monitoring parameter associated with a second monitoring symbol pattern, and
wherein the group of slots comprises at least the first slot and the second slot, and
wherein the first monitoring symbol pattern is different from the second monitoring symbol pattern.

Embodiment 12. The method of embodiment 11, further comprising:
at the UE, receiving the user data from the base station.

Embodiment 13. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to
while monitoring the PDCCH for paging messages, alternately performing the following operations for a group of slots for a duration:
according to a first PDCCH monitoring parameter associated with a first monitoring symbol pattern, initiating one or more first PDCCH monitoring occasions in a first slot,
according to a second PDCCH monitoring parameter associated with a second monitoring symbol pattern, initiating one or more second PDCCH monitoring occasions in a second slot, the second slot consecutively following the first slot,
wherein the group of slots comprises at least the first slot and the second slot, and
wherein the first monitoring symbol pattern is different from the second monitoring symbol pattern.

Embodiment 14. The communication system of embodiment 13, further including the UE.

Embodiment 15. The communication system of embodiment 14, wherein the cellular network further includes a base station configured to communicate with the UE.

Embodiment 16. The communication system of embodiment 13 or 14, wherein:
the processing circuitry of the host computer is configured to execute a host application, thereby providing the user data; and
the UE's processing circuitry is configured to execute a client application associated with the host application.

Embodiment 17. A method in a network node for configuring a wireless device to monitor a physical downlink control channel (PDCCH) for paging messages, the method comprising:
transmitting, to a wireless device, a first PDCCH monitoring parameter associated with a first monitoring symbol pattern, the first monitoring symbol pattern for monitoring for paging messages during a first slot of a group of slots during a duration; and
transmitting, to the wireless device, a second PDCCH monitoring parameter associated with a second monitoring symbol pattern, the second monitoring symbol pattern for monitoring for paging messages in a second slot of the group of slots during the duration, and
wherein the first monitoring symbol pattern is different from the second monitoring symbol pattern.

Embodiment 18. The method of embodiment 17, wherein:
the group of slots comprises at least a third slot consecutively following the second slot and a fourth slot consecutively following the third slot,
the first monitoring symbol pattern for monitoring for paging messages during third slot of the group of slots during the duration, and
the second monitoring symbol pattern for monitoring for paging messages during the fourth slot of the group of slots during the duration.

Embodiment 19. The method any one of embodiments 17 to 18, further comprising receiving from a network node:
the first PDCCH monitoring parameter associated with the first monitoring symbol pattern; and
the second PDCCH monitoring parameter associated with the second monitoring symbol pattern.

Embodiment 20. The method of any one of embodiments 17 to 19, wherein:
the first monitoring symbol pattern comprises a first pattern of OFDM symbols, each symbol in the first pattern of OFDM symbols identifying a starting symbol of a respective PDCCH monitoring occasion to be performed according to the first PDCCH monitoring parameter; and
the second monitoring symbol pattern comprises a second pattern of OFDM symbols, each symbol in the second pattern of OFDM symbol identifying a starting symbol of a respective PDCCH monitoring occasion to be performed according to the second PDCCH monitoring parameter.

Embodiment 21. The method of any one of embodiments 17 to 20, wherein at least one of:
the one or more first PDCCH monitoring occasions comprise a plurality of first PDCCH monitoring occasions that are each initiated with the first slot according to the first monitoring symbol pattern; and
the one or more second PDCCH monitoring occasions comprise a plurality of second PDCCH monitoring occasions that are each initiated with the second slot according to the second monitoring symbol pattern.

Embodiment 22. The method of any of embodiments 17 to 21, further comprising:
transmitting, to the wireless device, an indication that the wireless device is to alternately use the first PDCCH monitoring parameter associated with the first monitoring symbol pattern and the second PDCCH monitoring parameter associated with the second monitoring symbol pattern during the duration.

Embodiment 23. The method of embodiment 22, wherein indication to alternately use the first PDCCH monitoring parameter associated with the first monitoring symbol pattern and the second PDCCH monitoring parameter associated with the second monitoring symbol pattern during the duration is transmitted in response to:
determining that a paging occasion of the network node coincides with an synchronization signal (SS) Burst Set, the paging occasion identifying a regularly recurring time window during which the network node transmits paging; and
determining that a synchronization signal block (SSB) transmission pattern used for the SS Burst Set includes different OFDM symbols for the first slot and the second slot consecutively following the first slot.

Embodiment 24. A computer program comprising instructions which when executed on a computer perform any of the methods of embodiments 17 to 23.

Embodiment 25. A computer program product comprising computer program, the computer program comprising instructions which when executed on a computer perform any of the methods of embodiments 17 to 23.

Embodiment 26. A non-transitory computer readable medium storing instructions which when executed by a computer perform any of the methods of embodiments 17 to 23.

Embodiment 27. A network node comprising:
memory operable to store instructions; and
processing circuitry operable to execute the instructions to cause the wireless device to perform any of embodiments 17 to 23.

Embodiment 28. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs
transmitting, to a wireless device, a first PDCCH monitoring parameter associated with a first monitoring symbol pattern, the first monitoring symbol pattern for monitoring for paging messages during a first slot of a group of slots during a duration; and
transmitting, to the wireless device, a second PDCCH monitoring parameter associated with a second monitoring symbol pattern, the second monitoring symbol pattern for monitoring for paging messages in a second slot of the group of slots during the duration, and
wherein the first monitoring symbol pattern is different from the second monitoring symbol pattern.

Embodiment 29. The method of embodiment 28, further comprising:
at the base station, transmitting the user data.

Embodiment 30. The method of embodiment 29, wherein the user data is provided at the host computer by executing a host application, the method further comprising:
at the UE, executing a client application associated with the host application.

Embodiment 31. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
transmit, to the UE, a first PDCCH monitoring parameter associated with a first monitoring symbol pattern, the first monitoring symbol pattern for monitoring for paging messages during a first slot of a group of slots during a duration; and
transmit, to the UE, a second PDCCH monitoring parameter associated with a second monitoring symbol pattern, the second monitoring symbol pattern for monitoring for paging messages in a second slot of the group of slots during the duration, and
wherein the first monitoring symbol pattern is different from the second monitoring symbol pattern.

Embodiment 32. The communication system of embodiment 31, further including the base station.

Embodiment 33. The communication system of embodiment 32, further including the UE, wherein the UE is configured to communicate with the base station.

Embodiment 34. The communication system of embodiment 33, wherein:
the processing circuitry of the host computer is configured to execute a host application, thereby providing the user data; and
the UE comprises processing circuitry configured to execute a client application associated with the host application.

Embodiment 36. A method in a wireless device, the method comprising:
determining whether a paging occasion coincides with a synchronization signal burst (SSB);
if the paging occasion coincides with the SSB, using a first PDCCH monitoring parameter associated with a first monitoring symbol pattern while monitoring the PDCCH during a group of slots for a duration; and
if the paging occasion does not coincide with the SSB, then during each slot in the group of slots, alternately using the first PDCCH monitoring parameter associated with the first monitoring symbol pattern and a second PDCCH monitoring parameter associated with a second monitoring pattern while monitoring the PDCCH for the duration, and
wherein the first monitoring symbol pattern is different from the second monitoring symbol pattern.

Embodiment 37. A method by a wireless device (110) for monitoring a physical downlink control channel, PDCCH, for paging messages, the method comprising:
while monitoring the PDCCH for paging messages, performing the following operations for a group of slots for a duration:
according to a first PDCCH monitoring parameter associated with a first monitoring symbol pattern, initiating monitoring of one or more first PDCCH monitoring occasions in a first slot,
according to a second PDCCH monitoring parameter associated with a second monitoring symbol pattern, initiating monitoring of one or more second PDCCH monitoring occasions in a second slot, the second slot consecutively following the first slot,
wherein the group of slots comprises at least the first slot and the second slot, and
wherein the first monitoring symbol pattern is different from the second monitoring symbol pattern.

Embodiment 38. A wireless device (110) comprising:
memory (130) operable to store instructions; and
processing circuitry (120) operable to execute the instructions to cause the wireless device to perform the following operations for a group of slots for a duration while monitoring the physical downlink control channel, PDCCH, for paging messages:
according to a first PDCCH monitoring parameter associated with a first monitoring symbol pattern, initiate monitoring of one or more first PDCCH monitoring occasions in a first slot,
according to a second PDCCH monitoring parameter associated with a second monitoring symbol pattern, initiate monitoring of one or more second PDCCH monitoring occasions in a second slot, the second slot consecutively following the first slot,
wherein the group of slots comprises at least the first slot and the second slot, and
wherein the first monitoring symbol pattern is different from the second monitoring symbol pattern.

Embodiment 39. A method in a network node (160) for configuring a wireless device (110) to monitor a physical downlink control channel, PDCCH, for paging messages, the method comprising:
transmitting, to a wireless device, a first PDCCH monitoring parameter associated with a first monitoring symbol pattern, the first monitoring symbol pattern for monitoring for paging messages in one or more first PDCCH monitoring occasions during a first slot of a group of slots during a duration; and transmitting, to the wireless device, a second PDCCH monitoring parameter associated with a second monitoring symbol pattern, the second monitoring symbol pattern for monitoring for paging messages in one or more second PDCCH monitoring occasions during a second slot of the group of slots during the duration, and wherein the group of slots comprises at least the first slot and the second slot and the second slot consecutively follows the first slot, and wherein the first monitoring symbol pattern is different from the second monitoring symbol pattern.

Embodiment 40. A network node (160) comprising:

memory (180) operable to store instructions; and processing circuitry (170) operable to execute the instructions to cause the network node to:

transmit, to a wireless device (110), a first physical downlink control channel, PDCCH, monitoring parameter associated with a first monitoring symbol pattern, the first monitoring symbol pattern for monitoring for paging messages in one or more first PDCCH monitoring occasions during a first slot of a group of slots during a duration; and transmit, to the wireless device, a second PDCCH monitoring parameter associated with a second monitoring symbol pattern, the second monitoring symbol pattern for monitoring for paging messages in one or more second PDCCH monitoring occasions during a second slot of the group of slots during the duration, and wherein the group of slots comprises at least the first slot and the second slot and the second slot consecutively follows the first slot, and wherein the first monitoring symbol pattern is different from the second monitoring symbol pattern.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GS 5G System
5G-S-TMSI The temporary identifier used in NR as a replacement of the S-TMSI in LTE
5QI 5G QoS Identifier
ABS Almost Blank Subframe
AN Access Network
AN Access Node
ARQ Automatic Repeat Request
AS Access Stratum
ASN.1 Abstract Syntax Notation One
AWGN Additive White Gaussian Noise
BCCH Broadcast Control Channel
BCH Broadcast Channel
BWP Bandwidth Part
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CORESET Control Resource Set
CP Cyclic Prefix
CPICH Common Pilot Channel
CPICH Ec/No CPICH Received energy per chip divided by the power density in the band
CQI Channel Quality information
C-RNTI Cell RNTI
CRC Cyclic Redundancy Check
CSI Channel State Information
DCCH Dedicated Control Channel
DCI Downlink Control Information
Div Notation indication integer division
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eDRX Extended DRX
eMBB Enhanced Mobile BroadBand
eNB E-UTRAN NodeB
ePDCCH enhanced Physical Downlink Control Channel
EPS Evolved Packet System
ETWS Earthquake and Tsunami Warning System
E-SMLC evolved Serving Mobile Location Center
E-UTRA Evolved UTRA
E-UTRAN Evolved Universal Terrestrial Radio Access Network
FDD Frequency Division Duplex
FFS For Further Study
FR Frequency Range
GERAN GSM EDGE Radio Access Network
GHz Gigahertz
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
ID Identity/Identifier
IMSI International Mobile Subscriber Identity
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
Mod Modulo
Ms Millisecond
MSC Mobile Switching Center
MSI Minimum System Identifier
NAS Non-Access Stratum
NR New Radio (The term for the 5G radio interface and radio access network in the technical reports and standard specifications 3GPP are working on)

NGC Next Generation Core
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSI Other System Information
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PCI Physical Cell Identity
PDCCH Physical Downlink Control Channel
PDP Profile Delay Profile
PDSCH Physical Downlink Shared Channel
PF Paging Frame
PO Paging Occasion
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
P-RNTI Paging RNTI
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
QCL Quasi Co-Located
RAB Radio Access Bearer
RAN Radio Access Network
RANAP Radio Access Network Application Part
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RWR Release with Redirect
SCH Synchronization Channel
SCell Secondary Cell
SCS Subcarrier Spacing
SDU Service Data Unit
SFN System Frame Number
SGW Serving Gateway
SI System Information
SIB System Information Block
SIB1 SIB-type 1
SNR Signal to Noise Ratio
S-NSSAI Single Network Slice Selection Assistance Information
SON Self Optimized Network
SS Synchronization Signal
SSB SS Block
SSS Secondary Synchronization Signal
S-TMSI S-Temporary Mobile Subscriber Identity
TBS Transport Block Size
TDD Time Division Duplex
TDOA Time Difference of Arrival
TOA Time of Arrival
TRP Transmission/Reception Point
TS Technical Specification
TSG Technical Specification Group
TSS Tertiary Synchronization Signal
TTI Transmission Time Interval
TX Transmission/Transmit/Transmitter
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WG Working Group
WLAN Wide Local Area Network

The invention claimed is:

1. A method by a wireless device for monitoring a physical downlink control channel (PDCCH) for paging messages for a group of slots for a duration, the group of slots comprising at least a first slot, a second slot, a third slot following the second slot, and a fourth slot following the third slot, while monitoring the PDCCH for paging messages, the wireless device initiating:
monitoring of one or more first PDCCH monitoring occasions in a first slot according to a first PDCCH monitoring parameter associated with a first monitoring symbol pattern;
according to a second PDCCH monitoring parameter associated with a second monitoring symbol pattern, initiating monitoring of one or more second PDCCH monitoring occasions in a second slot, the second slot consecutively following the first slot, the first monitoring symbol pattern being different from the second monitoring symbol pattern;
initiating monitoring of a third PDCCH monitoring occasion in the third slot according to the first PDCCH monitoring parameter associated with the first monitoring symbol pattern; and
initiating monitoring of a fourth PDCCH monitoring occasion in the fourth slot according to the second PDCCH monitoring parameter associated with the second monitoring symbol pattern.

2. The method of claim 1, wherein the first PDCCH monitoring parameter contains a bit string representing the first monitoring symbol pattern and wherein the second PDCCH monitoring parameter contains a bit string representing the second monitoring symbol pattern.

3. The method of claim 1, wherein the third slot consecutively follows the second slot and the fourth slot consecutively follows the third slot.

4. The method of claim 1, wherein the group of slots comprises at least one additional slot between the second slot and the third slot.

5. The method of claim 1, further comprising receiving from a network node:
the first PDCCH monitoring parameter associated with the first monitoring symbol pattern; and the second PDCCH monitoring parameter associated with the second monitoring symbol pattern.

6. The method of claim 1, wherein:
the first monitoring symbol pattern comprises a first bit string, each bit of the first bit string representing an Orthogonal Frequency Division Multiplexing (OFDM) symbol, wherein each bit set to one in the first bit string identifies a starting symbol of a respective PDCCH monitoring occasion to be monitored according to the first PDCCH monitoring parameter; and
the second monitoring symbol pattern comprises a second bit string, each bit of the second bit string representing an OFDM symbol, wherein each bit set to one in the second bit string identifies a starting symbol of a respective PDCCH monitoring occasion to be monitored according to the second PDCCH monitoring parameter.

7. The method of claim 1, wherein at least one of:
the one or more first PDCCH monitoring occasions comprise a plurality of first PDCCH monitoring occasions, wherein monitoring of each of the first plurality of PDCCH monitoring occasions is initiated in the first slot according to the first monitoring symbol pattern; and
the one or more second PDCCH monitoring occasions comprise a plurality of second PDCCH monitoring occasions, wherein monitoring of each of the plurality of second PDCCH monitoring occasions is initiated in the second slot according to the second monitoring symbol pattern.

8. The method of claim 1, wherein the steps of performing the operations for monitoring the PDCCH for paging messages according to the first PDCCH monitoring parameter associated with the first monitoring symbol pattern and the second PDCCH monitoring parameter associated with the second monitoring symbol pattern during the duration are performed in response to:
determining that a paging occasion configured by a network node coincides with a synchronization signal (SS) Burst Set, the paging occasion identifying a regularly recurring time window during which the network node may transmit paging.

9. The method of claim 1, wherein the steps of performing the operations for monitoring the PDCCH for paging messages according to the first PDCCH monitoring parameter associated with the first monitoring symbol pattern and the second PDCCH monitoring parameter associated with the second monitoring symbol pattern during the duration are performed in response to:
determining that a paging occasion configured by a network node partially overlaps with a SS Burst Set, the paging occasion identifying a regularly recurring time window during which the network node may transmit paging.

10. The method of claim 9, wherein upon determining that the paging occasion configured by the network node partially overlaps with the SS Burst Set, moving the paging occasion to make the paging occasion coincide with the SS Burst Set before initiating the monitoring the one or more first PDCCH monitoring occasions in the first slot and the one or more second PDCCH monitoring occasions in the second slot.

11. A method in a network node for configuring a wireless device to monitor a physical downlink control channel (PDCCH) for paging messages during a group of slots during a duration, the group of slots comprising at least a first slot, a second slot consecutively following the first slot, a third slot following the second slot, and a fourth slot following the third slot, the method comprising:
transmitting, to the wireless device, a first PDCCH monitoring parameter associated with a first monitoring symbol pattern, the first monitoring symbol pattern being configured for monitoring for paging messages in one or more first PDCCH monitoring occasions during a first slot of the group of slots during the duration, the first monitoring symbol pattern being configured for monitoring for paging messages during the third slot of the group of slots during the duration; and
transmitting, to the wireless device, a second PDCCH monitoring parameter associated with a second monitoring symbol pattern, the second monitoring symbol pattern being configured for monitoring for paging messages in one or more second PDCCH monitoring occasions during the second slot of the group of slots during the duration, the second monitoring symbol pattern being configured for monitoring for paging messages during the fourth slot of the group of slots during the duration, the first monitoring symbol pattern being different from the second monitoring symbol pattern.

12. The method of claim 11, wherein the first PDCCH monitoring parameter contains a bit string representing the first monitoring symbol pattern and wherein the second PDCCH monitoring parameter contains a bit string representing the second monitoring symbol pattern.

13. The method of claim 11, wherein the third slot consecutively follows the second slot and the fourth slot consecutively follows the third slot.

14. The method of claim 11, wherein the group of slots comprises at least one additional slot between the second slot and the third slot.

15. The method of claim 11, further comprising receiving from another network node:
the first PDCCH monitoring parameter associated with the first monitoring symbol pattern; and
the second PDCCH monitoring parameter associated with the second monitoring symbol pattern.

16. The method of claim 11, wherein:
the first monitoring symbol pattern comprises a first bit string, each bit of the first bit string representing an Orthogonal Frequency Division Multiplexing (OFDM) symbol, wherein each bit set to one in the first bit string identifies a starting symbol of a respective PDCCH monitoring occasion to be monitored according to the first PDCCH monitoring parameter; and
the second monitoring symbol pattern comprises a second bit string, each bit of the second bit string representing an ( )FDM symbol, wherein each bit set to one in the second bit string identifies a starting symbol of a respective PDCCH monitoring occasion to be monitored according to the second PDCCH monitoring parameter.

17. The method of claim 11, wherein at least one of:
the one or more first PDCCH monitoring occasions comprise a plurality of first PDCCH monitoring occasions for which monitoring is initiated in the first slot according to the first monitoring symbol pattern; and
the one or more second PDCCH monitoring occasions comprise a plurality of second PDCCH monitoring occasions for which monitoring is initiated in the second slot according to the second monitoring symbol pattern.

18. The method of claim 11, further comprising:
transmitting, to the wireless device, an indication that the wireless device is to use the first PDCCH monitoring parameter associated with the first monitoring symbol pattern and the second PDCCH monitoring parameter associated with the second monitoring symbol pattern during the duration.

19. The method of claim 18, wherein
transmitting the indication to use the first PDCCH monitoring parameter associated with the first monitoring symbol pattern and the second PDCCH monitoring parameter associated with the second monitoring symbol pattern during the duration is in response to determining that a paging occasion configured by the network node coincides with a synchronization signal (SS) Burst Set, the paging occasion identifying a regularly recurring time window during which the network node may transmit paging.

20. The method of claim 18, wherein transmitting the indication to use the first PDCCH monitoring parameter associated with the first monitoring symbol pattern and the second PDCCH monitoring parameter associated with the second monitoring symbol pattern during the duration is in response to determining that a paging occasion configured by the network node partially overlaps with a synchronization signal (SS) Burst Set, the paging occasion identifying a regularly recurring time window during which the network node may transmit paging, and wherein the method further comprises configuring the wireless device to move the paging occasion to make the paging occasion coincide with the SS Burst Set before initiating the monitoring the one or more first PDCCH monitoring occasions in the first slot and the one or more second PDCCH monitoring occasions in the second slot when the paging occasion configured by the network node partially overlaps with the SS Burst Set.

21. The method of claim 18, wherein transmitting the indication to use the first PDCCH monitoring parameter associated with the first monitoring symbol pattern and the second PDCCH monitoring parameter associated with the second monitoring symbol pattern during the duration is in response to determining that a synchronization signal block (SSB) transmission pattern used for the SS Burst Set includes different ( )FDM symbols for the first slot and the second slot consecutively following the first slot.

22. A wireless device comprising processing circuitry configured to monitor a physical downlink control channel (PDCCH) for paging messages for a group of slots for a duration, the group of slots comprising at least a first slot, a second slot, a third slot following the second slot, and a fourth slot following the third slot, the processing circuitry being configured to, while monitoring the PDCCH for paging messages, initiate monitoring of one or more first PDCCH monitoring occasions in a first slot according to a first PDCCH monitoring parameter associated with a first monitoring symbol pattern, the processing circuitry being further configured to:
according to a second PDCCH monitoring parameter associated with a second monitoring symbol pattern, initiate monitoring of one or more second PDCCH monitoring occasions in a second slot, the second slot consecutively following the first slot, wherein the first monitoring symbol pattern is different from the second monitoring symbol pattern;
initiate monitoring of a third PDCCH monitoring occasion in the third slot according to the first PDCCH monitoring parameter associated with the first monitoring symbol pattern; and
initiate monitoring of a fourth PDCCH monitoring occasion in the fourth slot according to the second PDCCH monitoring parameter associated with the second monitoring symbol pattern.

23. A network node comprising processing circuitry configured to configure a wireless device to monitor a physical downlink control channel (PDCCH) for paging messages during a group of slots during a duration, the group of slots comprising at least a first slot, a second slot consecutively following the first slot, a third slot following the second slot, and a fourth slot following the third slot, the processing circuitry being configured to:
transmit, to the wireless device, a first PDCCH monitoring parameter associated with a first monitoring symbol pattern configured for monitoring for paging messages in one or more first PDCCH monitoring occasions during the first slot of the group of slots during the duration, the first monitoring symbol pattern being configured for monitoring for paging messages during the third slot of the group of slots during the duration; and
transmit, to the wireless device, a second PDCCH monitoring parameter associated with a second monitoring symbol pattern, the second monitoring symbol pattern being configured for monitoring for paging messages in one or more second PDCCH monitoring occasions during the second slot of the group of slots during the duration, the second monitoring symbol pattern being configured for monitoring for paging messages during the fourth slot of the group of slots during the duration, the first monitoring symbol pattern being different from the second monitoring symbol pattern.

* * * * *